US011841811B2

(12) United States Patent
Prabhakar et al.

(10) Patent No.: US 11,841,811 B2
(45) Date of Patent: Dec. 12, 2023

(54) INSTRUMENTATION NETWORKS FOR DATA FLOW GRAPHS

(71) Applicant: SambaNova Systems, Inc., Palo Alto, CA (US)

(72) Inventors: Raghu Prabhakar, San Jose, CA (US); Matthew Thomas Grimm, Boise, ID (US); Sumti Jairath, Santa Clara, CA (US); Kin Hing Leung, Cupertino, CA (US); Sitanshu Gupta, San Jose, CA (US); Yuan Lin, Campbell, CA (US); Luca Boasso, Austin, TX (US)

(73) Assignee: SambaNova Systems, Inc., Palo Alto, CA (US)

( * ) Notice: Subject to any disclaimer, the term of this patent is extended or adjusted under 35 U.S.C. 154(b) by 144 days.

(21) Appl. No.: 17/479,906

(22) Filed: Sep. 20, 2021

(65) Prior Publication Data

US 2022/0261365 A1 Aug. 18, 2022

Related U.S. Application Data

(63) Continuation of application No. 17/175,289, filed on Feb. 12, 2021, now Pat. No. 11,126,574.

(51) Int. Cl.
*G06F 12/0806* (2016.01)
*G06F 13/20* (2006.01)
*G06F 15/78* (2006.01)

(52) U.S. Cl.
CPC .......... *G06F 13/20* (2013.01); *G06F 15/7867* (2013.01)

(58) Field of Classification Search
None
See application file for complete search history.

(56) References Cited

U.S. PATENT DOCUMENTS

| | | | | |
|---|---|---|---|---|
| 7,155,708 B2* | 12/2006 | Hammes | ................ | G06F 30/33 |
| | | | | 717/157 |
| 9,870,340 B2* | 1/2018 | Evangelinos | ....... | G06F 15/8076 |
| 11,126,574 B1* | 9/2021 | Prabhakar | ............. | G06F 11/302 |
| 2004/0088691 A1* | 5/2004 | Hammes | ................ | G06F 30/33 |
| | | | | 717/134 |
| 2006/0018176 A1* | 1/2006 | Au | .......................... | G06F 5/065 |
| | | | | 365/230.01 |
| 2014/0372628 A1* | 12/2014 | Jorgensen | ........... | H04L 12/6418 |
| | | | | 709/245 |

(Continued)

*Primary Examiner* — Hyun Nam
(74) *Attorney, Agent, or Firm* — Flagship Patents; Sikander Khan; Bruce Young

(57) ABSTRACT

A reconfigurable processor comprises an array of processing units and an instrumentation network. The array of processing units is configured to execute runtime events to execute an application. The instrumentation network is operatively coupled to the array of processing units. The instrumentation network comprises a control bus configured to form control signal routes in the instrumentation network. The instrumentation network further comprises a plurality of instrumentation counters having inputs and outputs connected to the control bus and to the processing units. Instrumentation counters in the plurality instrumentation units are configurable to consume control signals on the inputs and produce counts of the runtime events on the outputs.

10 Claims, 21 Drawing Sheets
(9 of 21 Drawing Sheet(s) Filed in Color)

(56) References Cited

U.S. PATENT DOCUMENTS

| | | | |
|---|---|---|---|
| 2015/0169021 A1* | 6/2015 | Salessi | G11C 29/021 |
| | | | 713/300 |
| 2019/0303263 A1* | 10/2019 | Fleming, Jr. | G06F 11/3024 |
| 2021/0373867 A1* | 12/2021 | Chen | G06F 8/41 |
| 2022/0261364 A1* | 8/2022 | Prabhakar | G06F 11/302 |
| 2022/0261365 A1* | 8/2022 | Prabhakar | G06F 9/4494 |
| 2023/0087886 A1* | 3/2023 | Burt | G05B 19/41865 |
| | | | 700/28 |

* cited by examiner

| Stage | Producers | Consumers |
|---|---|---|
| S0 | [Not Shown] | A,B,C |
| S1 | A,B,C | L |
| S1.0 | D, E | F |
| S1.1 | F | G |
| S1.2 | G | H |
| S1.3 | H | I |
| S1.4 | I,J | K |
| S2 | L | [Not Shown] |

Figure 7

INSTRUMENTATION NETWORKS FOR DATA FLOW GRAPHS

PRIORITY APPLICATION

This application is a continuation of U.S. patent application Ser. No. 17/175,289, entitled "INSTRUMENTATION PROFILING FOR RECONFIGURABLE PROCESSORS," filed Feb. 12, 2021. The non-provisional application is incorporated by reference for all purposes.

FIELD OF THE TECHNOLOGY DISCLOSED

The present technology relates to instrumentation profiling of runtime execution of dataflow pipelines on reconfigurable processors, which can be applied to Coarse-Grained Reconfigurable Architectures (CGRAs) and other distributed execution systems.

INCORPORATIONS

The following are incorporated by reference for all purposes as if fully set forth herein:

Prabhakar et al., "Plasticine: A Reconfigurable Architecture for Parallel Patterns," ISCA '17, Jun. 24-28, 2017, Toronto, ON, Canada;

Koeplinger et al., "Spatial: A Language and Compiler for Application Accelerators," *Proceedings Of The 39th ACM SIGPLAN Conference On Programming Language Design And Implementation* (PLDI), Proceedings of the 43rd International Symposium on Computer Architecture, 2018;

Ashish Vaswani et al., "Attention Is All You Need," *Advances in Neural Information Processing Systems*, pages 6000-6010, 2017;

Jacob Devlin et al., "Bert: Pre-Training of Deep Bidirectional Transformers For Language Understanding," *arXiv preprint arXiv:* 1810.04805, 2018;

IBM, "POWER9 Performance Monitor Unit User's Guide," *OpenPOWER*, Version 1.2, 28 Nov. 2018, accessible at https://wiki.raptorcs.com/w/images/6/6b/POWER9_PMU_UG_v12_28NOV2018_pub.pdf;

Intel, "Intel® FPGA SDK for Pro Edition: Best Practices Guide," Version 20.4, 14 Dec. 2020, accessible at https://www.intel.com/content/dam/www/programmable/us/en/pdfs/literature/hb/opencl-sdk/aocl-best-practices-guide.pdf;

U.S. Nonprovisional patent application Ser. No. 16/239,252, filed Jan. 3, 2019, titled, "VIRTUALIZATION OF A RECONFIGURABLE DATA PROCESSOR,";

U.S. Nonprovisional patent application Ser. No. 16/197,826, filed Nov. 21, 2018, titled, "CONFIGURATION LOAD OF A RECONFIGURABLE DATA PROCESSOR,";

U.S. Nonprovisional patent application Ser. No. 16/198,086, filed Nov. 21, 2018, titled, "CONFIGURATION UNLOAD OF A RECONFIGURABLE DATA PROCESSOR,";

U.S. Nonprovisional patent application Ser. No. 16/260,548, filed Jan. 29, 2019, titled, "MATRIX NORMAL/TRANSPOSE READ AND A RECONFIGURABLE DATA PROCESSOR INCLUDING SAME,";

U.S. Nonprovisional patent application Ser. No. 16/536,192, filed Aug. 8, 2019, titled, "COMPILER FLOW LOGIC FOR RECONFIGURABLE ARCHITECTURES,";

U.S. Nonprovisional patent application Ser. No. 16/407,675, filed May 9, 2019, titled, "CONTROL FLOW BARRIER AND RECONFIGURABLE DATA PROCESSOR,";

U.S. Nonprovisional patent application Ser. No. 16/504,627, filed Jul. 8, 2019, titled, "QUIESCE RECONFIGURABLE DATA PROCESSOR,";

U.S. Nonprovisional patent application Ser. No. 16/572,516, filed Sep. 16, 2019, titled, "EFFICIENT EXECUTION OF OPERATION UNIT GRAPHS ON RECONFIGURABLE ARCHITECTURES BASED ON USER SPECIFICATION,";

U.S. Nonprovisional patent application Ser. No. 16/744,077, filed Jan. 15, 2020, titled, "COMPUTATIONALLY EFFICIENT SOFTMAX LOSS GRADIENT BACKPROPAGATION,";

U.S. Nonprovisional patent application Ser. No. 16/590,058, filed Oct. 1, 2019, titled, "COMPUTATION UNITS FOR FUNCTIONS BASED ON LOOKUP TABLES,";

U.S. Nonprovisional patent application Ser. No. 16/695,138, filed Nov. 25, 2019, titled, "COMPUTATIONAL UNITS FOR BATCH NORMALIZATION,";

U.S. Nonprovisional patent application Ser. No. 16/688,069, filed Nov. 19, 2019, titled, "LOOK-UP TABLE WITH INPUT OFFSETTING,";

U.S. Nonprovisional patent application Ser. No. 16/718,094, filed Dec. 17, 2019, titled, "COMPUTATIONAL UNITS FOR ELEMENT APPROXIMATION,";

U.S. Nonprovisional patent application Ser. No. 16/560,057, filed Sep. 4, 2019, titled, "SIGMOID FUNCTION IN HARDWARE AND A RECONFIGURABLE DATA PROCESSOR INCLUDING SAME,";

U.S. Nonprovisional patent application Ser. No. 16/572,527, filed Sep. 16, 2019, titled, "PERFORMANCE ESTIMATION-BASED RESOURCE ALLOCATION FOR RECONFIGURABLE ARCHITECTURES,";

U.S. Nonprovisional patent application Ser. No. 15/930,381, filed May 12, 2020, titled, "COMPUTATIONALLY EFFICIENT GENERAL MATRIX-MATRIX MULTIPLICATION (GeMM),";

U.S. Nonprovisional patent application Ser. No. 16/890,841, filed Jun. 2, 2020, titled, "ANTI-CONGESTION FLOW CONTROL FOR RECONFIGURABLE PROCESSORS,";

U.S. Nonprovisional patent application Ser. No. 17/023,015, filed Sep. 16, 2020, titled, "COMPILE TIME LOGIC FOR DETECTING STREAMING COMPATIBLE AND BROADCAST COMPATIBLE DATA ACCESS PATTERNS,";

U.S. Nonprovisional patent application Ser. No. 17/031,679, filed Sep. 24, 2020, titled, "SYSTEMS AND METHODS FOR MEMORY LAYOUT DETERMINATION AND CONFLICT RESOLUTION,";

U.S. Nonprovisional patent application Ser. No. 16/922,975, filed Jul. 7, 2020, titled, "RUNTIME VIRTUALIZATION OF RECONFIGURABLE DATAFLOW RESOURCES,";

U.S. Nonprovisional patent application Ser. No. 16/996,666, filed Aug. 18, 2020, titled, "RUNTIME PATCHING OF CONFIGURATION FILES,";

U.S. Nonprovisional patent application Ser. No. 17/127,818, filed Dec. 18, 2020, titled, "INTRA-NODE BUFFER-BASED STREAMING FOR RECONFIGURABLE PROCESSOR-AS-A-SERVICE (RPaaS),"; and U.S. Nonprovisional patent application Ser. No. 17/127,929, filed Dec. 18, 2020, titled, "INTER-NODE BUFFER-BASED STREAMING FOR RECONFIGURABLE PROCESSOR-AS-A-SERVICE (RPaaS),".

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Reconfigurable processors, including Field Programmable Gate Arrays (FPGAs), can be configured to implement a variety of functions more efficiently or faster than might be achieved using a general purpose processor executing a computer program. So-called Coarse-Grained Reconfigurable Architectures (CGRAs) are being developed in which configurable units in an array are more complex than used in typical, more fine-grained FPGAs, and can enable faster or more efficient execution of various classes of functions. For example, CGRAs have been proposed that can enable implementation of energy-efficient accelerators for machine learning and artificial intelligence workloads. See, Prabhakar, et al., "Plasticine: A Reconfigurable Architecture for Parallel Patterns," ISCA '17, Jun. 24-28, 2017, Toronto, ON, Canada.

To execute deep learning applications on CGRAs, CGRA compilers generate dataflow pipelines that have arbitrary levels of hierarchy, nested loops, and memory access patterns (synchronous and asynchronous). Efficient execution of these dataflow pipelines requires partitioning them into stages and executing the stages on the spatially distributed processing elements of the CGRAs in a balanced fashion. Bottlenecks can be introduced if the stages are imbalanced, often due to improper parallelization, suboptimal hardware resource allocation, inadequate buffer depths provided at stage boundaries, or improper resource placement causing bottlenecks in the interconnect fabric.

Accurately measuring runtime execution time at each pipeline stage enables the programmer to tune the relevant parts of the application. As all stages are executing spatially in a concurrent manner, performance can be especially sensitive to any added control synchronization inserted for profiling purposes. Hence, identifying and debugging performance bottlenecks in runtime execution is a challenging endeavor.

Hardware and software techniques to measure runtime stage latencies of dataflow pipelines while introducing minimal overheads are disclosed.

Performance measurement is used for understanding systems that are already built or prototyped. There are two major purposes performance measurement can serve: (i) tune a system or systems-to-be-built, and (ii) tune the application if source code and algorithms can still be changed. Essentially, the process involves (i) understanding the bottlenecks in the system that has been built, (ii) understanding the applications that are running on the system and the match between the features of the system and the characteristics of the workload, and (iii) innovating design features that will exploit the workload features. Some techniques for performance measurement in General Purpose Processors (GPPs) include microprocessor on-chip performance monitoring counters, off-chip hardware monitoring, software monitoring, and microcoded instrumentation.

An opportunity arises to develop performance measurement techniques that are well-suited for the spatially distributed compute network of the reconfigurable processors and pipelined runtime execution of the deep learning applications.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The color drawings also may be available in PAIR via the Supplemental Content tab.

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

FIG. 7 illustrates one implementation of classifying the stage buffers as producers and consumers on a stage-by-stage basis.

DETAILED DESCRIPTION

Figure 1:
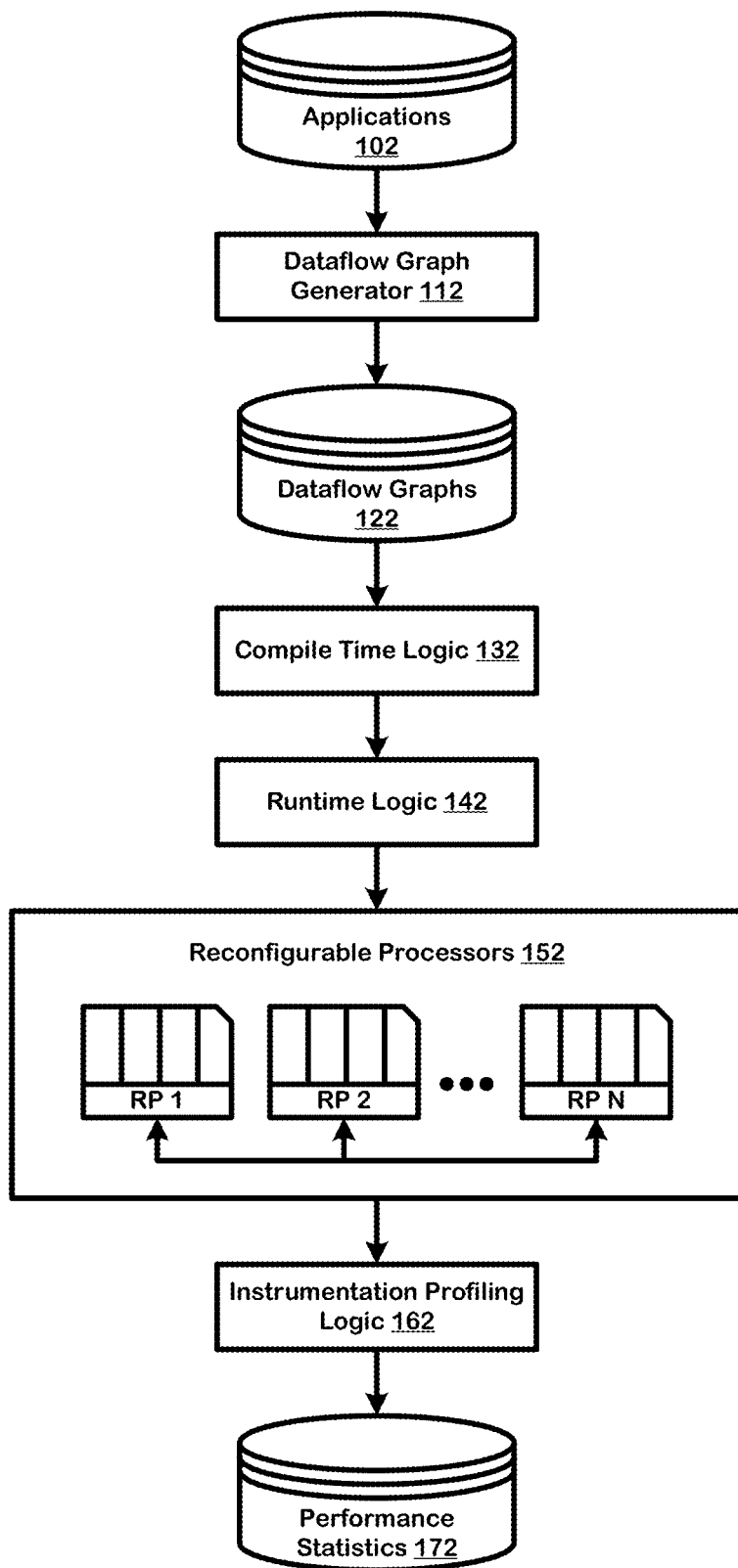
FIG. 1 is a system diagram of one implementation of a data processing system disclosed herein.

The following discussion is presented to enable any person skilled in the art to make and use the technology disclosed and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

Introduction

The technology disclosed measures and characterizes the performance of hierarchical, nested dataflow pipelines with concurrently running stages by measuring cumulative stage execution times. In one implementation, the technology disclosed creates one or more "start" and "stop" conditions for each stage, where elapsed time between "start" and "stop" events is measured.

In some implementations, one "unit of execution" for a stage is defined as the amount of computation to be performed by a stage to consume one unit of data from its input buffers and produce one unit of data to all its output buffers. The unit of data is determined by the program, and, for example, corresponds to one tensor of data, like a batch of input samples, activations, or gradients.

In one implementation, the disclosed compiler/compile time logic 132 instruments data flow programs by programmatically producing two control events per stage: a "start" event corresponding to the beginning of one execution unit, and a "stop" event corresponding to the end of one execution unit. One (start, stop) event pair is used to program a hardware instrumentation counter in the reconfigurable processors 152. In one implementation, the instrumentation counter counts up by 1 every clock cycle after the "start" event occurs and stops counting after the "stop" event occurs.

The "start" event is defined as the cycle where an input buffer begins the first read to commence one execution unit for the stage. In one implementation, data and control dependencies gating the "read" operation can be recorded as a bit mask over a set of token buffers that store the occurrence of control events. The "start" event, in this case, can be implemented as a control barrier across the same set of token buffers identified in the bit mask to produce a new control event only when all read dependencies are satisfied. In another implementation, the "start" event can be defined as the cycle when a unit of data becomes available in an input buffer. This implementation differs from the previous implementation in that the "start" event happens much earlier, and hence would include the number of cycles an input buffer's read is stalled after the data is available.

The "stop" event is defined as the cycle where all output buffers have received all outputs corresponding to one unit of execution of stage. In one implementation, each output buffer can produce a new "write done" control event that indicates that one unit of data has been written into the buffer. This control event can be programmatically produced and can handle any arbitrary memory access pattern, tensor shape, and tensor layout. The "stop" event can then be produced by implementing a distributed control barrier that combines several such "write done" events from all output buffers to produce a new control event. The "start" and "stop" events need not happen sequentially, one after the other.

During pipelined execution on a reconfigurable processor (e.g., reconfigurable processor 1500), multiple execution units can simultaneously be in flight. For example, while output data from one execution unit is being written into the output buffers of a stage, input data for the next execution could be read out from the input buffers and sent to the compute units via the interconnect. Profiling such cases is handled by buffering all "start" events and "stop" events in a hardware token buffer. The instrumentation counter continues to count as long as there is at least one execution unit in flight. The instrumentation counter stops only after all in-flight execution units have produced all their outputs.

In the case where a pipeline stage has a single input buffer and a single output buffer, the number obtained from the hardware instrumentation counter directly represents the total number of elapsed clock cycles during the execution of the stage.

In cases where a stage has multiple input and output buffers, additional support is required either in the compiler or in a postprocessing utility to accurately discern stage latencies. In one implementation, the compiler instruments each input buffer separately. One instrumentation counter is programmed per tuple of one input buffer and all reachable output buffers from the input buffer. Each instrumentation counter then counts the cumulative cycles for which that specific input buffer path was active.

A postprocessing utility can then combine the latencies from each input buffer using an aggregation method. As a stage is active only when all inputs are active, using a "MIN" aggregation of elapsed cycles from all input buffers can be used. In another implementation, the compiler can insert additional synchronization across the read operations of all input buffers, or "input siblings," of a stage. The additional "sibling synchronization" can be implemented as a control barrier that produces a new control event only when all dependencies of all input buffers are met. The synchronization limits the skew between the start times of input buffers of a stage. In this implementation, the "start" event is defined as the control event corresponding to the "sibling synchronization" event. No postprocessing is needed in this case, as only one instrumentation counter is programmed per tuple of input buffers and output buffers for a stage.

The instrumentation counters are programmable counters because the events that can be count can be specified by software (i.e., the compile time logic 132). In one implementation, the instrumentation counters are 32-bit registers that count events. A sequence of instrumentation counters can be chained in some implementations.

Data Processing System

FIG. 1 is a system diagram of one implementation of a data processing system disclosed herein. Reconfigurable processors 152 include an array of configurable units (e.g., compute units and memory units) in a programmable interconnect fabric. The array of configurable units in a reconfigurable processor is partitionable into a plurality of sub-arrays (or tiles) of configurable units. Additional details about a CGRA-implementation of the reconfigurable processors 152 are discussed later using FIGS. 15, 16, 16A, 17, 18, and 19.

A pool of reconfigurable dataflow resources that includes the reconfigurable processors 152 also includes bus resources (or transfer resources). Examples of the bus resources include PCIe channels, DMA channels, and DDR channels. The pool of reconfigurable dataflow resources also includes memory resources (or storage resources). Examples of the memory resources include main memory (e.g., off-chip/external DRAM), local secondary storage (e.g., local disks (e.g., HDD, SSD)), and remote secondary storage (e.g., distributed file systems, web servers). Other examples of the memory resources include latches, registers, and caches (e.g., SRAM). The pool of reconfigurable dataflow resources is dynamically scalable to meet the performance objectives required by applications 102. The applications 102 access the pool of reconfigurable dataflow resources over one or more networks (e.g., Internet).

In some implementations, different compute scales and hierarchies constitute the pool of reconfigurable dataflow resources according to different implementations of the technology disclosed. In one example, the pool of reconfigurable dataflow resources is a node (or a single machine) that runs a plurality of reconfigurable processors 152, supported by required bus and memory resources. The node also includes a host processor (e.g., CPU) that exchanges data with the plurality of reconfigurable processors 152, for example, over a PCIe interface. The host processor includes a runtime processor that manages resource allocation, memory mapping, and execution of the configuration files for applications requesting execution from the host processor. In another example, the pool of reconfigurable dataflow resources is a rack (or cluster) of nodes, such that each node in the rack runs a respective plurality of reconfigurable processors 152 and includes a respective host processor configured with a respective runtime processor. The runtime processors are distributed across the nodes and communicate with each other so that they have unified access to the reconfigurable processors 152 attached not only to their own node on which they run, but also to the reconfigurable processors 152 attached to every other node in the data center.

The nodes in the rack are connected, for example, over Ethernet or InfiniBand (IB). In yet another example, the pool of reconfigurable dataflow resources is a pod that comprises a plurality of racks. In yet another example, the pool of reconfigurable dataflow resources is a superpod that comprises a plurality of pods. In yet another example, the pool of reconfigurable dataflow resources is a zone that comprises a plurality of superpods. In yet another example, the pool of reconfigurable dataflow resources is a data center that comprises a plurality of zones.

Deep Learning Applications

The applications 102 are executed on the reconfigurable processors 152 in a distributed fashion by programming the individual compute and memory components to asynchronously receive, process, and send data and control information. In the reconfigurable processors 152, computation can be executed as deep, nested dataflow pipelines that exploit nested parallelism and data locality very efficiently. These dataflow pipelines contain several stages of computation, where each stage reads data from one or more input buffers with an irregular memory access pattern, performs computations on the data while using one or more internal buffers to store and retrieve intermediate results, and produces outputs that are written to one or more output buffers. The structure of these pipelines depends on the control and dataflow graph representing the application. Pipelines can be arbitrarily nested and looped within each other.

The applications 102 comprise high-level programs. A high-level program is source code written in programming languages like C, C++, Java, JavaScript, Python, and Spatial, for example, using deep learning frameworks like PyTorch, TensorFlow, ONNX, Caffe, and Keras. The high-level program can implement computing structures and algorithms of machine learning models like AlexNet, VGG-Net, GoogLeNet, ResNet, ResNeXt, RCNN, YOLO, SqueezeNet, SegNet, GAN, BERT, ELMo, USE, Transformer, and Transformer-XL. In one example, the high-level program can implement a convolutional neural network with several processing layers, such that each processing layer can include one or more nested loops. The high-level program can execute irregular memory operations that involve accessing inputs and weights and performing matrix multiplications between the inputs and the weights. The high-level program can include nested loops with high iteration count and loop bodies that load and multiply input values from a preceding processing layer with weights of a succeeding processing layer to produce an output for the succeeding processing layer. The high-level program can have loop-level parallelism of the outermost loop body, which can be exploited using coarse-grained pipelining. The high-level program can have instruction-level parallelism of the inner loop body, which can be exploited using loop unrolling, SIMD vectorization, and pipelining.

Regarding loops in the high-level programs of the applications 102, loops directly nested in a loop body are termed the child loops of the outer parent loop. A loop is called an inner loop if it does not have any children, i.e., there are no nested loops within its body. A loop is an outermost loop if it does not have a parent, i.e., it is not nested within another loop's body. An imperfectly nested loop has a body with a mix of non-looping statements (e.g., primitive arithmetic, logical, and relational operations) and one or more child loops. Parallelism in the imperfectly nested loops can be exploited at any or all loop levels, and in the operations that comprise loop bodies. Parallelism can occur in multiple forms such as fine-grained and coarse-grained pipeline parallelism, data parallelism, and task parallelism.

In some implementations, a software development kit (SDK) (or dataflow graph generator 112) generates dataflow graphs 122 of the high-level programs of the applications 102. The SDK transforms the input behavioral description of the high-level programs into an intermediate representation such as the dataflow graphs 122. This may include code optimization steps like false data dependency elimination, dead-code elimination, and constant folding. The dataflow graphs 122 encode the data and control dependencies of the high-level programs.

The dataflow graphs 122 comprise nodes and edges. The nodes can represent compute operations and memory allocations. The edges can represent dataflow and control flow. In some implementations, each loop in the high-level programs can be represented as a "controller" in the dataflow graphs 122. The dataflow graphs 122 support branches, loops, function calls, and other variations of control and carried dependencies. In some implementations, after the dataflow graphs 122 are generated, additional analyses or optimizations focused on loop transformations can be performed, such as loop unrolling, loop pipelining, loop fission/fusion, and loop tiling.

The SDK also supports programming the reconfigurable processors 152 in the pool of reconfigurable dataflow resources at multiple levels, for example, from the high-level deep learning frameworks to C++ and assembly language. In some implementations, the SDK allows programmers to develop code that runs directly on the reconfigurable processors 152. In other implementations, the SDK provides libraries that contain predefined functions like linear algebra operations, element-wise tensor operations, non-linearities, and reductions required for creating, executing, and profiling the dataflow graphs 122 on the reconfigurable processors 152. The SDK communicates with the deep learning frameworks via application programming interfaces (APIs).

The nodes in a dataflow graph represent operation units that are configured to be producers to produce tensors for execution of an application, and to be consumers to consume the tensors for execution of the application. The producers and consumers asynchronously transmit data along data connections. A tensor includes one or more vectors. Compile time logic 132 determines a data access pattern for each operation unit in the dataflow graph. The data access pattern of an operation unit is defined by an operation type implemented by the operation unit. A write access pattern of a particular producer specifies an order in which the particular producer generates elements of a tensor. A read access pattern of a corresponding consumer specifies an order in which the corresponding consumer processes the elements of the tensor. Write access patterns of the producers and read access patterns of the consumers are stored in memory and span all known operations like non-linearities such as rectified linear unit (ReLU) and its variants (e.g., leaky ReLU), hyperbolic tangent (tanh), sigmoid, softmax, etc., element-wise addition, matrix multiplication (e.g., general matrix multiply (GeMM)), layer normalization (e.g., batch normalization), and so on.

Compile Time Logic

The compile time logic 132 transforms the dataflow graphs 122 into a hardware-specific configuration, which is specified in an execution file generated by the compile time logic 132. In one implementation, the compile time logic 132 partitions the dataflow graphs 122 into memory allocations and execution fragments, and these partitions are specified in the execution file. Execution fragments represent operations on data. An execution fragment can comprise portions of a program representing an amount of work. An execution fragment can comprise computations encompassed by a set of loops, a set of graph nodes, or some other unit of work that requires synchronization. An execution fragment can comprise a fixed or variable amount of work, as needed by the program. Different ones of the execution fragments can contain different amounts of computation. Execution fragments can represent parallel patterns or portions of parallel patterns and are executable asynchronously.

In some implementations, the partitioning of the dataflow graphs 122 into the execution fragments includes treating calculations within at least one inner loop of a nested loop of the dataflow graphs 122 as a separate execution fragment. In other implementations, the partitioning of the dataflow graphs 122 into the execution fragments includes treating calculations of an outer loop around the inner loop of the dataflow graphs 122 as a separate execution fragment. In the case of imperfectly nested loops, operations within a loop body up to the beginning of a nested loop within that loop body are grouped together as a separate execution fragment.

Memory allocations represent the creation of logical memory spaces in on-chip and/or off-chip memories for data required to implement the dataflow graphs 122, and these memory allocations are specified in the execution file. Memory allocations define the type and the number of hardware resources (functional units, storage, or connectivity components). Main memory (e.g., DRAM) is off-chip memory for which the memory allocations can be made. Scratchpad memory (e.g., SRAM) is on-chip memory for which the memory allocations can be made. Other memory types for which the memory allocations can be made for various access patterns and layouts include read-only lookup-tables (LUTs), fixed size queues (e.g., FIFOs), and register files.

The compile time logic 132 binds memory allocations to virtual memory units and binds execution fragments to virtual compute units, and these bindings are specified in the execution file. In some implementations, the compile time logic 132 partitions execution fragments into memory fragments and compute fragments, and these partitions are specified in the execution file. A memory fragment comprises address calculations leading up to a memory access. A compute fragment comprises all other operations in the parent execution fragment. In one implementation, each execution fragment is broken up into a plurality of memory fragments and exactly one compute fragment. In one implementation, the compile time logic 132 performs the partitioning using reverse dataflow analysis such that inputs to an address used in a memory access are recursively flagged until the compile time logic 132 reaches either constant values or (bound) loop/pattern iterators. A single execution fragment can produce one or more memory fragments, depending on how many memory accesses exist in the original loop body. In cases where the same memory addressing logic is shared across multiple memory accesses, address calculation may be duplicated to create multiple memory fragments from the same execution fragment.

The memory fragments of the execution fragments are configured to index into data structures. At least one of the memory fragments indexes into a data structure in the logical memory spaces of one of the memory allocations. Each compute and memory fragment preserves information about all loops whose loop bodies directly contain the operations in the corresponding execution fragment. In one implementation, this corresponds to replicating the calculation of the loop iterators of each loop into each compute and memory fragment. This replication allows each fragment to preserve the same iterative behavior as the original program while also allowing distributed calculation of loop iterators.

The compile time logic 132 assigns the memory fragments to the virtual memory units and assigns the compute fragments to the virtual compute units, and these assignments are specified in the execution file. Each memory fragment is mapped operation-wise to the virtual memory unit corresponding to the memory being accessed. Each operation is lowered to its corresponding configuration intermediate representation for that virtual memory unit. Each compute fragment is mapped operation-wise to a newly allocated virtual compute unit. Each operation is lowered to its corresponding configuration intermediate representation for that virtual compute unit.

The compile time logic 132 allocates the virtual memory units to physical memory units of the reconfigurable processors 152 (e.g., pattern memory units (PMUs) of the reconfigurable processors 152) and allocates the virtual compute units to physical compute units of the reconfigurable processors 152 (e.g., pattern compute units (PCUs) of the reconfigurable processors 152), and these allocations are specified in the execution file. The compile time logic 132 places the physical memory units and the physical compute units onto positions in an array of configurable units of the reconfigurable processors 152 and routes data and control networks between the placed positions, and these placements and routes are specified in the execution file. In one implementation, this includes allocating physical resources such as counters and registers within each physical memory and compute unit, and these allocations are specified in the execution file.

The compile time logic 132 translates the applications 102 developed with commonly used open-source packages such as Keras and PyTorch into reconfigurable processor specifications. The compile time logic 132 generates configuration files (bit files/bit streams) with configuration data for the placed positions and the routed data and control networks. In one implementation, this includes assigning coordinates and communication resources of the physical memory and compute units by placing and routing units on the reconfigurable processors 152 while maximizing bandwidth and minimizing latency. The compile time logic 132 loads the configuration files on the reconfigurable processors 152 and causes the configuration files to implement the dataflow graphs 122. In some implementations, the dataflow graph generator 112 is part of the compile time logic 132.

Figure 2:
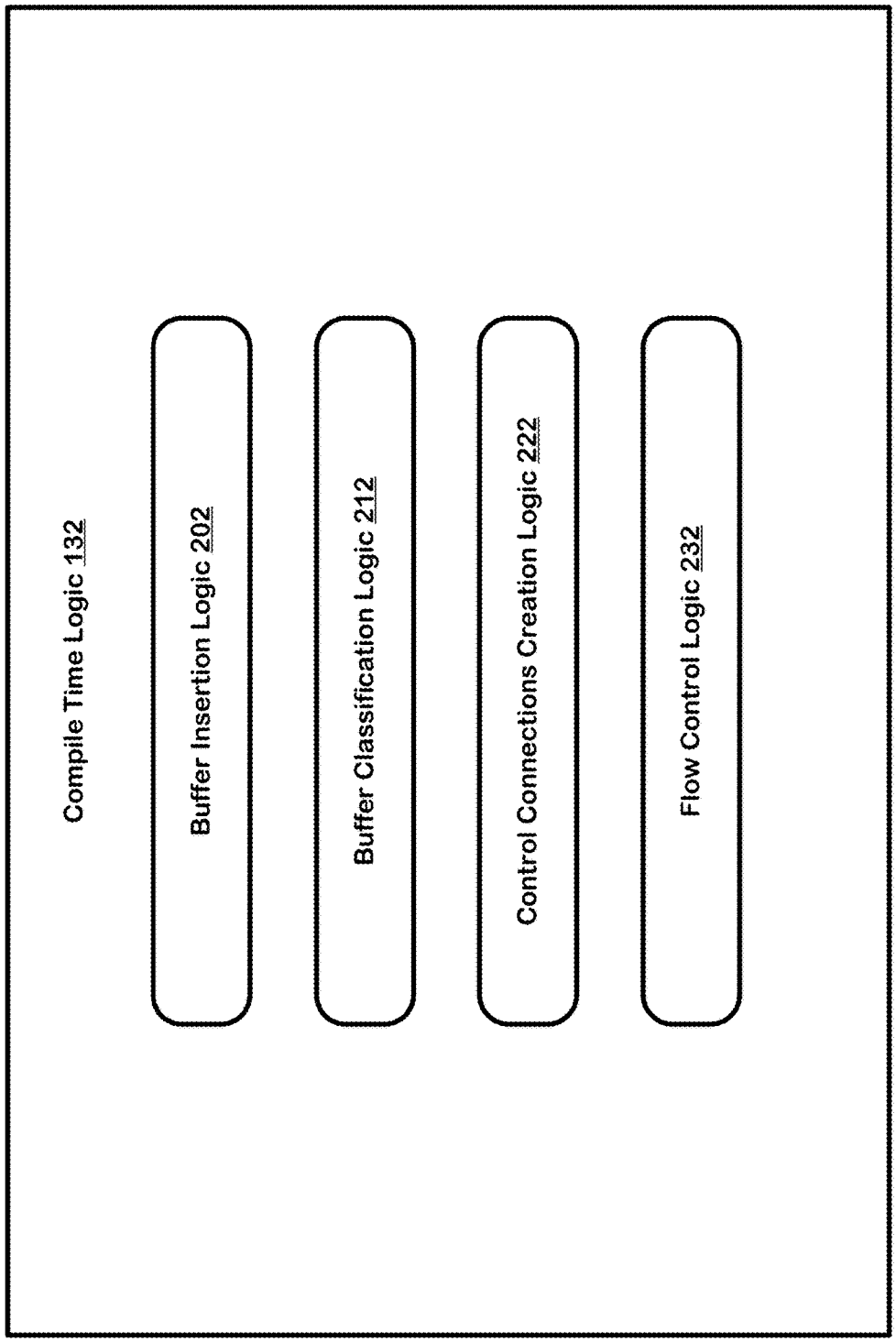
FIG. 2 shows one implementation of a compile time logic used by the data processing system.

FIG. 2 shows one implementation of the compile time logic 132. The compile time logic 132 is configured with buffer insertion logic 202, buffer classification logic 212, control connections creation logic 222, and flow control logic 232.

The buffer insertion logic 202 is configured to partition execution of a dataflow graph into two or more asynchronous stages by inserting stage buffers (buffers/controllers/control nodes) inside the loop at the second level and at input/output boundaries between the loop at the first level and the loop at the second level. Each of the stages includes a subset of the compute nodes. Each of the stages includes one or more compute nodes in the plurality of compute nodes, and the stage buffers include, for each of the stages, one or more input stage buffers and one or more output stage buffers. The buffer insertion logic 202 is further configured to insert additional stage buffers inside the loop at the second level. The additional stage buffers are configured to interface with the stage buffers inserted at the input/output boundaries between the loop at the first level and the loop at the second level.

The buffer classification logic 212 is configured to classify the stage buffers as producers (input stage buffers) and consumers (output stage buffers) on a stage-by-stage basis by classifying those stage buffers that provide input data to a particular stage as the producers and classifying those stage buffers that store output data from the particular stage as the consumers.

The control connections creation logic 222 is configured to create control connections between the stage buffers by extending the control connections from the consumers in the particular stage to the producers in the particular stage. The control connections extend from a particular consumer to one or more corresponding producers that write data into the particular consumer.

The flow control logic 232 is configured to process the dataflow graph and generate flow control data for the dataflow graph. The flow control logic 232 is configured to control data transmission between the compute nodes along the data connections by using the control connections to control writing of the data by the producers into the consumers. For example, the flow control logic 232 is configured to configure each of the producers with a ready-to-read credit counter, such that the ready-to-read credit counter of a particular producer is initialized with as many read credits as a buffer depth of a corresponding consumer that reads data from the particular producer. The ready-to-read credit counter is configured to decrement when the particular producer begins writing a buffer data unit into the corresponding consumer along a data connection. The ready-to-read credit counter is configured to increment when the particular producer receives from the corresponding consumer a read ready token along a control connection. The read ready token indicates to the particular producer that the corresponding consumer has freed a buffer data unit and is ready to receive an additional buffer data unit. The particular producer stops writing data into the corresponding consumer when the ready-to-read credit counter has zero read credits. The particular producer resumes writing data into the corresponding consumer when the particular producer receives the read ready token from the corresponding consumer. In some implementations, the particular producer writes data into two or more corresponding consumers that have respective buffer depths. The respective buffer depths include a minimum buffer depth. The ready-to-read credit counter is initialized with as many read credits as the minimum buffer depth.

In another example, the flow control logic 232 is configured to configure each of the producers with a write credit counter that is initialized with one or more write credits. The write credit counter is configured to decrement when the particular producer begins writing the buffer data unit into the corresponding consumer along the data connection. The write credit counter is configured to increment when the particular producer receives from the corresponding consumer a write done token along the control connection. The write done token indicates to the particular producer that the writing of the buffer data unit into the corresponding consumer has completed. The particular producer stops writing data into the corresponding consumer when the write credit counter has zero write credits. The particular producer resumes writing data into the corresponding consumer when the particular producer receives the write done token from the corresponding consumer.

In one implementation, a particular stage has two or more consumers and a set of producers. In such an implementation, the flow control logic 232 is configured to create barrier connections that extend from the two or more of the consumers to the producers in the set of producers. The barrier connections control transmission of the read ready token and the write done token from the two or more of the consumers to the producers in the set of the producers.

In one implementation, the loop at the second level is implemented with multiple parallel pipelines. In such an implementation, the flow control logic 232 is configured to insert the stage buffers and create the control connections between the stage buffers respectively for each pipeline in the multiple parallel pipelines.

In one implementation, the loop at the second level is a sequential loop. In such an implementation, the flow control logic 232 is further configured to configure the stage buffers inserted inside the loop at the second level with a buffer depth of one, and to extend the control connections inside the loop at the second level only from the consumers that are at an egress point of the loop at the second level to the producers that are at an ingress point of the loop at the second level.

The compile time logic 132 is configured to map each of the stage buffers to one or more pattern memory units (PMUs) of the reconfigurable processors 152. The compile time logic 132 is configured to map each of the compute nodes to one or more pattern compute units (PCUs) of the reconfigurable processors 152. The compile time logic 132 is configured to implement the control connections between the PMUs and the PCUs on a control network of the reconfigurable processors 152. The compile time logic 132 is configured to implement the data connections between the PMUs and the PCUs on a data network of the reconfigurable processors 152. The data network includes a vector sub-network for transmission of vector data, and a scalar sub-network for transmission of scalar data. Each of the PMUs and the PCUs are configurable with one or more vector input ports, scalar input ports, vector output ports, scalar output ports, and control ports.

Runtime Logic

Runtime logic 142 parses the execution file and determines configurations of virtual data flow resources required to execute the applications 102. The runtime logic 142 allocates physical configurable units and memory in the pool of reconfigurable data flow resources to the virtual data flow resources. The runtime logic 142 executes the configuration files using the allocated physical configurable units and memory.

Figure 3:
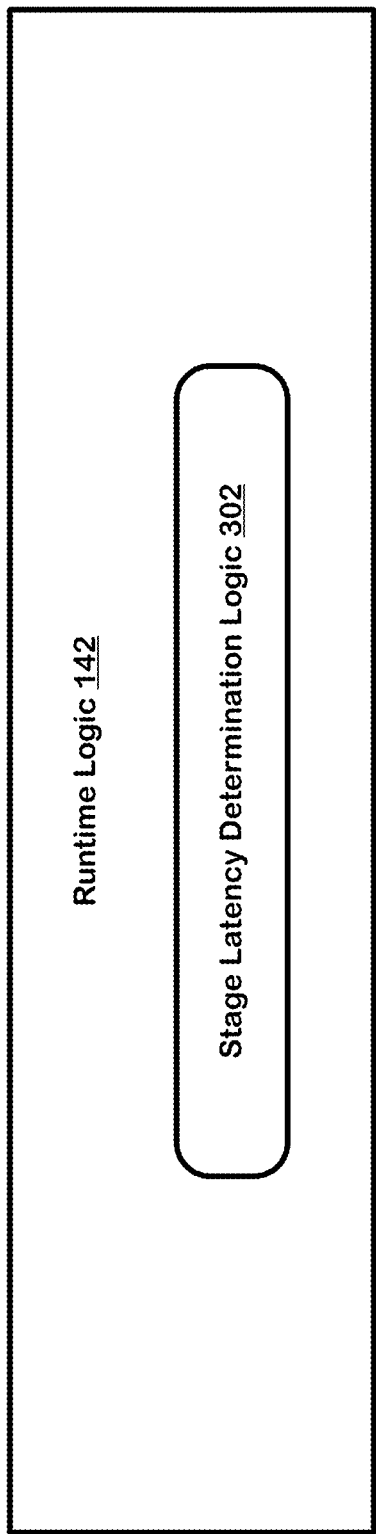
FIG. 3 shows one implementation of a runtime logic used by the data processing system.

FIG. 3 shows one implementation of the runtime logic 142. The runtime logic 142 is configured with stage latency determination logic 302. The stage latency determination logic 302 determines a stage latency for each of the stages of the dataflow graph by calculating elapsed time between input stage buffers of a particular stage receiving a unit of data and output stage buffers of the particular stage receiving results of processing the unit of data through one or more compute nodes of the particular stage.

Instrumentation Profiling

Instrumentation profiling logic 162 is configured to generate performance statistics 172 for the dataflow graph based on the stage latency determined for each of the stages. In some implementations, the instrumentation profiling logic 162 is part of the runtime logic 142.

Dataflow Graph

Figure 4:
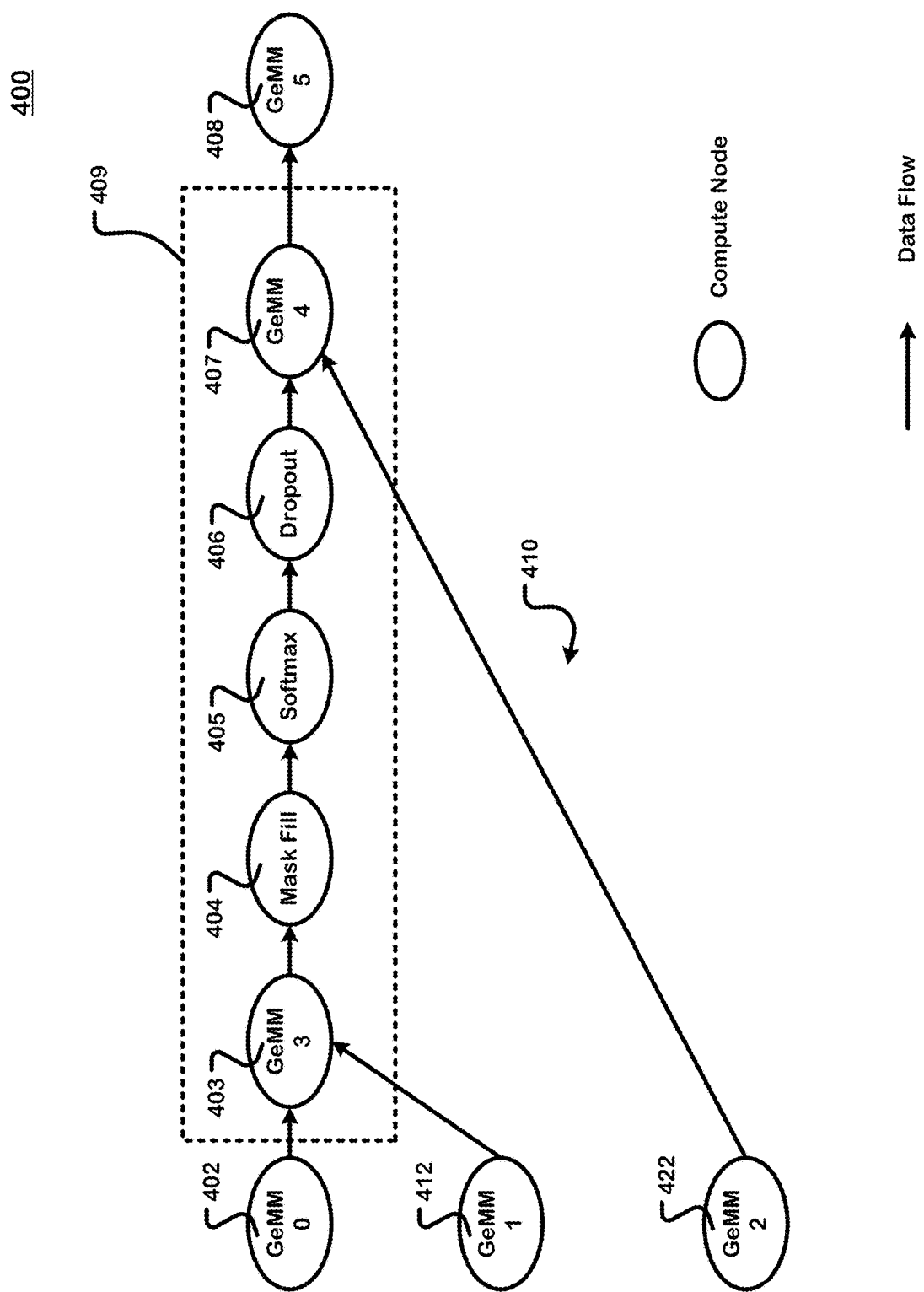
FIG. 4 illustrates one implementation of execution of a dataflow graph for a deep learning application.

FIG. 4 illustrates one implementation of execution of a dataflow graph 400 for a deep learning application. An operation of the dataflow graph 400 comprises at least a producer, a compute node, and a consumer. The producer provides an input (e.g., vector, tensor) to the compute node. The compute node processes the input and generates an output (e.g., a weighted sum produced by a dot product operation). The compute node provides the output to the consumer.

One skilled in the art will appreciate that the dataflow graph 400 can comprise a plurality of producers, a plurality of compute nodes, and a plurality of consumers, such that a compute node can receive input from multiple producers and can provide output to multiple consumers. In the context of this application, when it is stated that a particular producer writes data into a corresponding consumer, it is to be understood that the particular producer provides data to a compute node, which in turn processes the data, generates an alternative representation of the data, and writes the alternative representation of the data into the corresponding consumer. In one example, the alternative representation can be the result of a General Matrix Multiply (GeMM) operation.

In the context of this application, a producer can be referred to as an upstream buffer or upstream memory node/unit, a compute node can be referred to as an intermediate computing node/unit or intermediate processing node/unit, and a consumer can be referred to as a downstream buffer or downstream memory node/unit. Additionally, the producers, the compute nodes, and the consumers operate asynchronously and therefore use the flow control logic 232 described herein to handle backpressure and avoid processing bottlenecks and buffer overflows between the producers and the consumers.

The dataflow graph 400 has compute nodes that asynchronously transmit data along data connections. In the illustrated example, the dataflow graph 400 represents the so-called multi-head attention module of the Transformer and BERT deep learning models, which are incorporated herein by reference. The dataflow graph 400 includes a loop nest in which loops are arranged in a hierarchy of levels, such that a loop at a second level 409 is within a loop at a first level 410. The loop at the first level 410 includes four matrix multiplication nodes 402, 412, 422, 408, and can be considered an outer loop 410. The loop at the second level 409 includes an ingress matrix multiplication node 403, a mask fill node 404, a softmax node 405, a dropout node 406, and an egress matrix multiplication node 407, and can be considered an inner loop 409.

In the outer loop 410, each of the first three matrix multiplication nodes 402, 412, 422 receives a respective input (e.g., a respective tensor), executes a General Matrix Multiply (GeMM) operation on the respective input using a respective set of weights, and produces a respective output. The outputs from the first three matrix multiplication nodes 402, 412, 422 are piecewise processed by the inner loop 409 over multiple iterations, and each of the multiple iterations can be parallelized by parallelizing multiple instances of the inner loop 409. This is a first data transfer point/boundary between the outer loop 410 and the inner loop 409 at which data is transmitted from the outer loop 410 to the inner loop 409.

The outputs from the multiple iterations are combined (e.g., concatenated) to generate an input for the matrix multiplication node 408 of the outer loop 410. This is a second data transfer point/boundary between the inner loop 409 and the outer loop 410 at which data is transmitted from the inner loop 409 to the outer loop 410.

Buffer Insertion and Stage Partitioning

Figure 5:
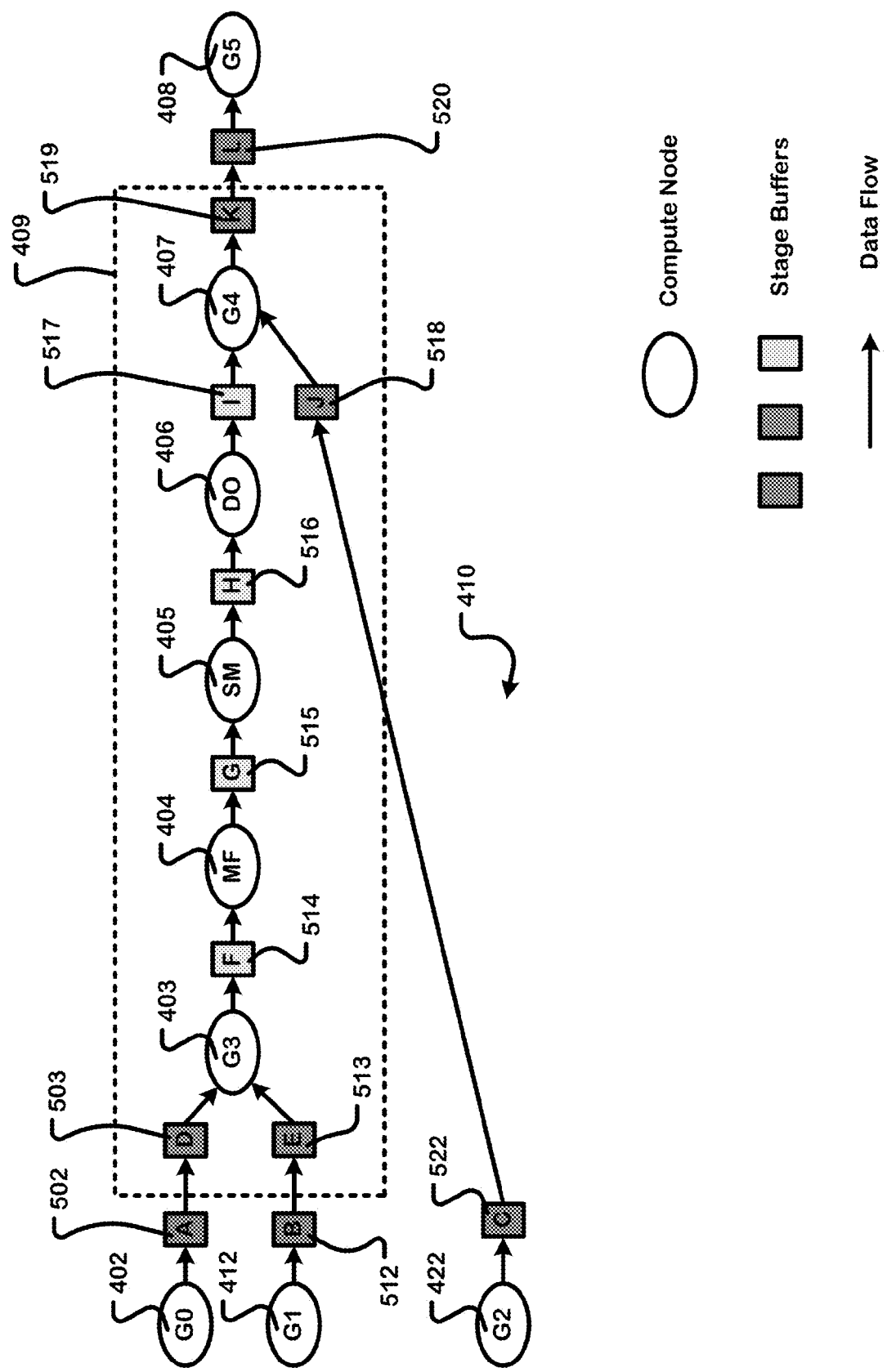
FIG. 5 illustrates one implementation of stage buffers inserted in the dataflow graph.

FIG. 5 illustrates one implementation of stage buffers inserted in the dataflow graph 400. In the illustrated example, three types of stage buffers are inserted: (1) inter-stage buffers, (2) intra-stage buffers, and (3) interface buffers based on the cost model of the compute nodes of the dataflow graph 400.

The inter-stage buffers are inserted at input/output boundaries between the loop at the first level 410 and the loop at the second level 409 (i.e., between compute nodes at the data transfer points/boundaries between the outer loop 410 and the inner loop 409). The intra-stage buffers are inserted inside the loop at the second level 409 (e.g., between compute nodes inside the inner loop 409). The interface buffers are also inserted inside the inner loop 409 to interface with the inter-stage buffers for layout and access pattern transformations. The interface buffers are used because the granularity of communication (i.e., the size of the tensor/data produced/consumed) varies between loops at different levels.

In the illustrated example, the inter-stage buffers are depicted in blue and include stage buffers 502, 512, 522, 520. The intra-stage buffers are depicted in yellow and include stage buffers 514, 515, 516, 517. The interface buffers are depicted in orange and include stage buffers 503, 513, 518, 519.

Figure 6:
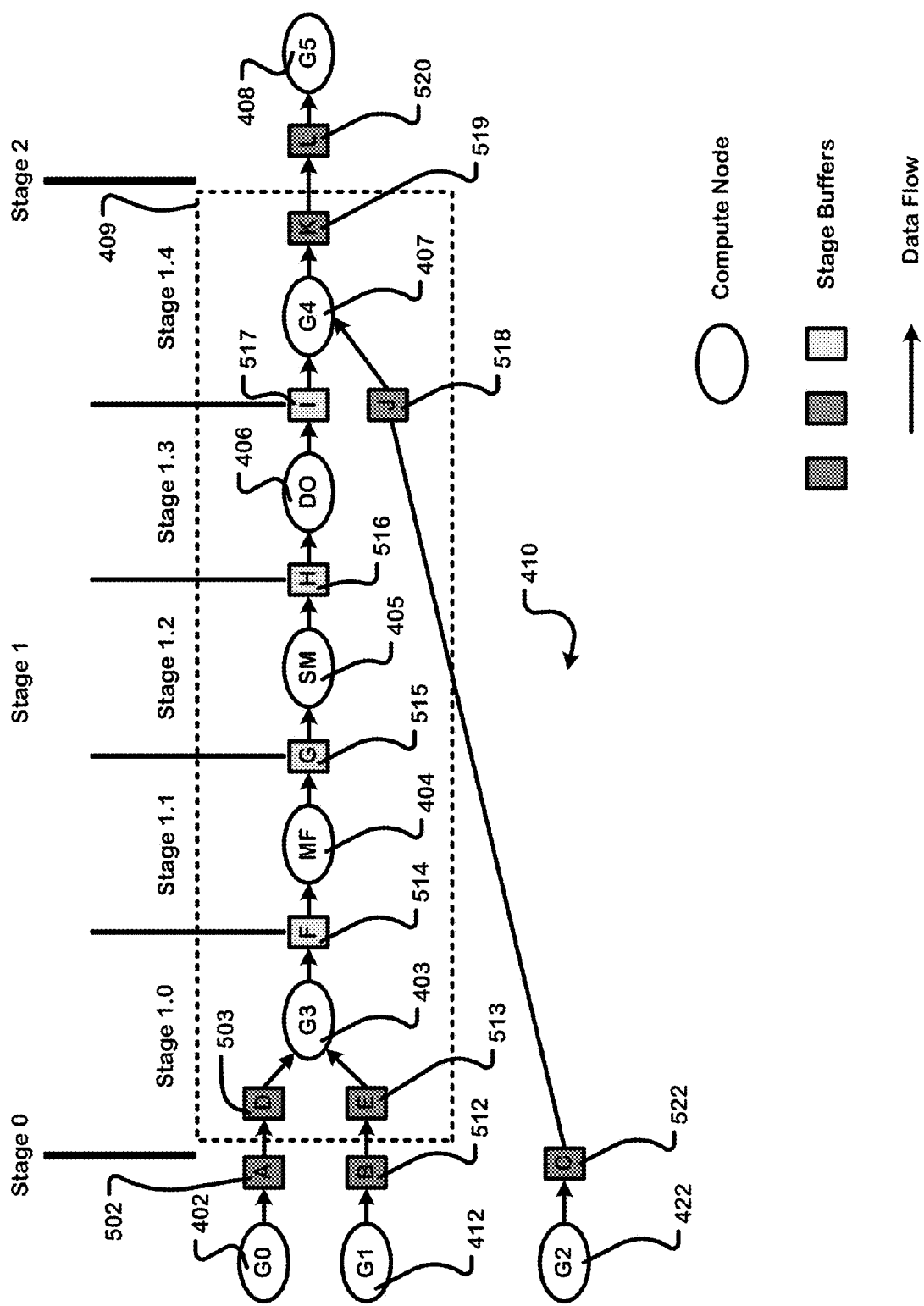
FIG. 6 illustrates one implementation of partitioning execution of the dataflow graph into a plurality of stages.

FIG. 6 illustrates one implementation of partitioning execution of the dataflow graph into a plurality of stages. In the illustrated example, execution of the dataflow graph 400 is partitioned into at least three stages: stage 0, stage 1, and stage 2. Execution of stage 1 is further partitioned into five stages: stage 1.0, stage 1.1, stage 1.2, stage 1.3, and stage 1.4.

Buffer Classification

FIG. 7 illustrates one implementation of classifying the stage buffers as producers and consumers on a stage-by-stage basis. Those stage buffers that provide input data to a particular stage are classified as the producers. Those stage buffers that store output data from the particular stage classified as the consumers. In FIG. 7, note that the classification changes from stage-to-stage, such that a particular stage buffer can be a consumer in a given stage and a producer in another stage. For example, stage buffers A, B, C (502, 512, 522) are consumers in stage 0 and producers in stage 1. Similarly, stage buffer G (515) is a consumer in stage 1.1 and a producer in stage 1.2.

Control Connections

Figure 8:
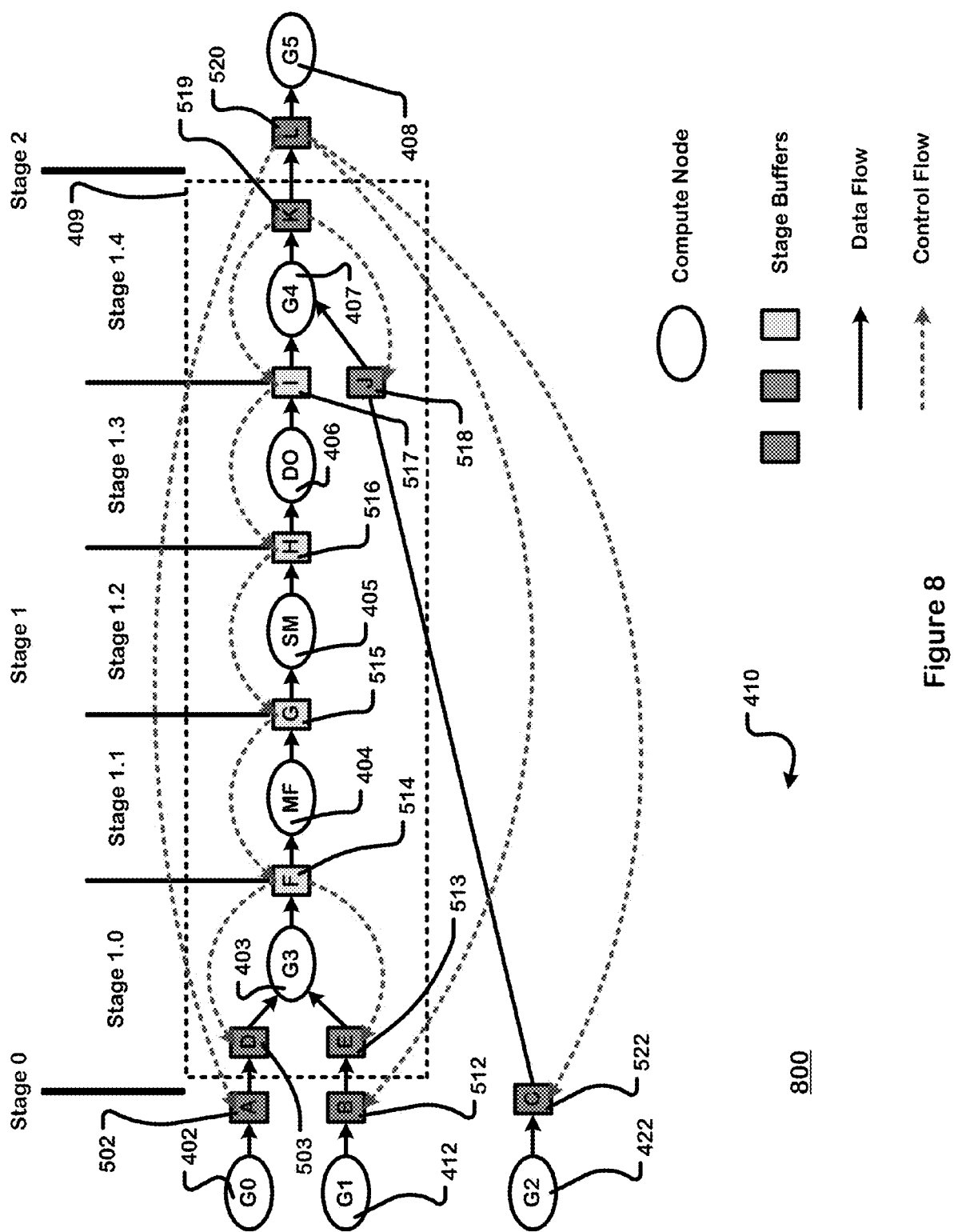
FIG. 8 illustrates one implementation of control connections created between the stage buffers on a stage-by-stage basis.

FIG. 8 illustrates one implementation of control connections created between the stage buffers on a stage-by-stage basis by extending the control connections from the consumers in a particular stage to the producers in the particular stage. The control connections are implemented on a control bus of a control network of a reconfigurable processor. The control connections extend from a particular consumer to one or more corresponding producers that write data into the particular consumer. For example, for stage 1, the producers are stage buffers A, B, C (502, 512, 522) and the consumer is stage buffer L (520), and therefore three control connections extend from the stage buffer L (520) to the stage buffers A, B, C (502, 512, 522), respectively. Similarly, for stage 1.0, the producers are stage buffers D, E (503, 513), and the consumer is stage buffer F (514), and therefore two control connections extend from the stage buffer F (514) to the stage buffers D and E (503, 513), respectively.

Instrumentation Counters

The technology disclosed uses instrumentation counters to determine stage latencies in runtime execution of the stages of the dataflow graph 400. As discussed later using FIGS. 15, 16, 17, 18, and 19, in one implementation, the instrumentation counters are hardware units (instrumentation units) configured with instrumentation logic and operatively coupled to the processing elements/configurable units (e.g., pattern compute units (PCUs)), pattern memory units (PMUs) of the chip/integrated circuit (e.g., reconfigurable processor 1500) that executes the dataflow graph 400 at runtime. In one implementation, each of the stages of the dataflow graph 400 is executed at runtime by one or more associated processing elements/configurable units, and the instrumentation counters are operatively coupled to the associated processing elements/configurable units to measure the stage latency of the corresponding stage at runtime.

Schedules and Dependencies

The configuration files, generated by the compile time logic 132, define schedules and dependencies of compute operations and memory operations configured to execute the dataflow graph 400. The schedules defined by the configuration files can be pipelined, sequential, or streaming execution. For example, the outer loop 410 is a first pipeline and the inner loop 409 is a second pipeline. A current iteration of the second pipeline is scheduled to execute after the current iteration of the first pipeline has executed. In pipelined execution, the execution of loop iterations is overlapped. In innermost loops (e.g., loop 409), the degree of overlap is based on the controller's average initiation interval. In outer loops (e.g., loop 410), the amount of overlap is determined by the controller's depth, which is defined as the maximum number of outer loop iterations a stage is allowed to execute before its consumer stages begin execution.

In sequential execution, a single iteration of a loop body is executed in its entirety before the next iteration begins. Sequential scheduling is equivalent to pipelining with the initiation interval equal to the loop body's latency, or, for outer stage buffers, a depth of one. Streaming execution overlaps stages further by allowing each inner stage buffer to run synchronously when inputs are available. Streaming is a well-defined control scheme when communication between stage buffers is done through either streaming interfaces or queues.

Program loops can be categorized according to the types of dependencies which they contain. A dependence between two operations in a program is a relation that constrains their execution order. Examples of the dependencies include read-after-write (true dependencies or flow dependencies), write-after-read (anti-dependencies), and write-after-write (output dependencies). Dependencies between different operations in the same iteration of a loop are called intra-iteration dependencies. Dependencies between different iterations of a loop are called loop-carried dependencies. Hardware loop pipelining exploits parallelism in these dependencies, for example, by overlapping computations for different loop iterations in a pipelined fashion. In one implementation, for example, a single deeply pipelined circuit is instantiated for the loop body, and computations for the different loop iterations are overlapped in time and space. Other examples of dependencies include loop-independent dependencies and loop-control dependencies.

The compile time logic 132 pipelines the loops regardless of their nesting levels. Inner pipeline schedules are based on their initiation interval (II). The compiler first collects resource initiation intervals for each primitive node in the given controller based on an internal, target-dependent lookup table. Most primitive operations are pipelined for a resource initiation interval of one. The compile time logic 132 then calculates all loop-carried dependencies within the pipeline based on the dataflow graph 400. For non-addressable memories, the total initiation interval is the maximum of path lengths between all dependent reads and the writes. For addressable memories, the path length of loop-carried dependencies is also multiplied by the difference in write and read addresses. If the addresses are loop-independent, the initiation interval is the path length if they may be equal, and one if they are provably never equal. If the distance between the addresses cannot be determined statically, the initiation interval is infinite, meaning the loop must be run sequentially. The final initiation interval of the controller is defined as the maximum of the initiation intervals of all loop-carried dependencies and all resource initiation intervals. The compile time logic 132 also pipelines the bodies of outer control nodes in a similar manner, but computes dataflow scheduling in terms of inner control nodes and number of stages. The compile time logic 132 also pipelines the multiple iterations of the outer loop through the stage buffers of the outer loop.

Stage Latencies

The technology disclosed uses control signals to determine the stage latencies. Examples of the control signals include read ready tokens, read begun tokens, read done tokens, write ready tokens, write begun tokens, write done tokens, and barrier tokens. The control signals are pulse signals routed through the control network and exchanged (propagated along the control connections). In one implementation, the control signals represent start events and stop events characterizing start and stop of data processing operations implemented during execution of the dataflow graph 400 (e.g., compute operations, memory operations, routing operations, and/or control operations).

As discussed above, the inner loop 410 is configurable to be executed for n iterations for each iteration of the outer loop 410. For example, consider that the outer loop 410 processes a batch of thousand images and each image has three dimensions (e.g., RGB). Furthermore, the inner loop 409 processes the thousand images on a dimension-by-dimension basis. Then, for the batch, a thousand iterations of the outer loop 410 are executed for the thousand images and three thousand iterations of the inner loop 409 are executed for the three dimensions of each of the thousand images. The instrumentation counters are used to determine the stage latencies at the batch-level for both the outer loop 410 and the inner loop 409.

Multiple Producers, Single Consumer

Consider the example of the outer loop 410. Stage 1 has three producers A, B, C and one consumer L. Further consider that, in a single iteration of stage 1, producer A receives as input a first tensor with Q vectors, producer B receives as input a second tensor with K vectors, and producer C receives as input a third tensor with V vectors. The inner loop 410 processes the first, second, and third tensors as input and produces as output a fourth tensor with Z vectors.

Figure 9:
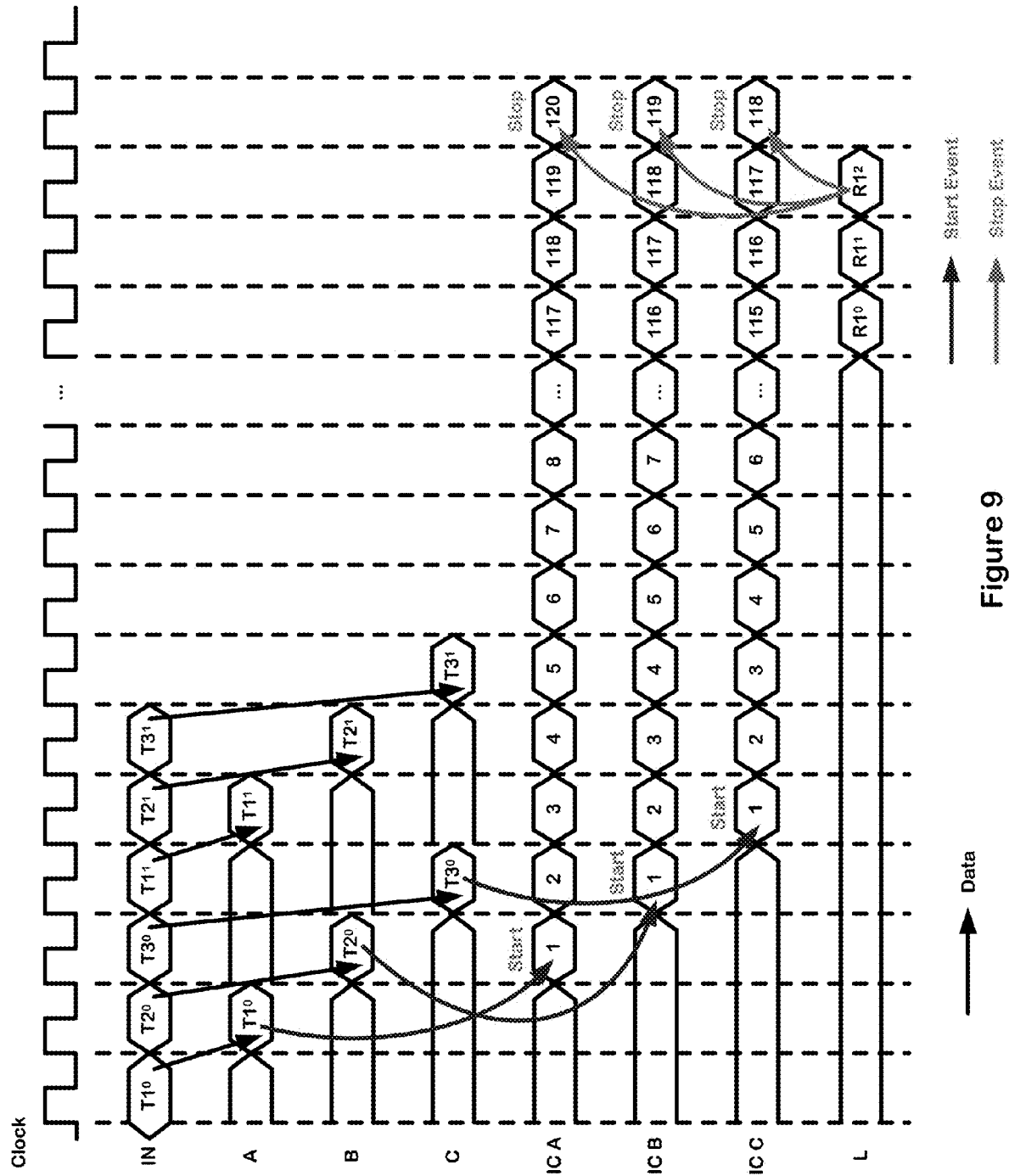
FIG. 9 is a timing diagram of determining stage latency of an iteration of an outer loop of the dataflow graph using instrumentation counters.

Along the y-axis, the timing diagram in FIG. 9 shows operation of the producers A, B, C and the consumer L for a current iteration of stage 1. The y-axis also shows respective instrumentation counters IC A, IC B, IC C of the producers A, B, C configured with instrumentation logic and operatively coupled to configurable units of the reconfigurable processors implementing the producers A, B, C on the chip at runtime. The x-axis shows clock cycles elapsed during data processing operations implemented by the producers A, B, C and the consumer L for the current iteration (e.g., compute operations, memory operations, routing operations, and/or control operations). The x-axis also shows clock cycles elapsed during count accumulation (or incrementation) of the instrumentation counters IC A, IC B, IC C in response to the data processing operations.

At cycle 2, the producer A receives, from an input source (IN), a first vector from among the Q vectors of the first tensor ($T1^0$). In response, the producer A releases a read begun token (depicted as a start event in blue). The read begun token triggers the instrumentation counter IC A at cycle 3.

At cycle 3, the producer B receives, from the input source (IN), a first vector from among the K vectors of the second tensor ($T2^0$). In response, the producer B releases a read begun token (depicted as a start event in blue). The read begun token triggers the instrumentation counter IC B at cycle 4.

At cycle 4, the producer C receives, from the input source (IN), a first vector from among the V vectors of the third tensor ($T3^0$). In response, the producer C releases a read begun token (depicted as a start event in blue). The read begun token triggers the instrumentation counter IC C at cycle 5.

At cycle 121, the consumer L receives a last vector ($R1^2$) from among the Z vectors of the fourth tensor (R1, R denotes results). In response, the consumer L releases a write done token (depicted as a stop event in magenta). The write done token is received by each of the producers A, B, C at cycle 122 along the control bus of the control network. The write done token stops the instrumentation counter IC A at count 120. The instrumentation counter IC A outputs 120 as the instrumentation count for the producer A. The write done token stops the instrumentation counter IC B at count 119. The instrumentation counter IC B outputs 119 as the instrumentation count for the producer B. The write done token stops the instrumentation counter IC C at count 118. The instrumentation counter IC C outputs 118 as the instrumentation count for the producer C.

The instrumentation counts reported by the instrumentation counters IC A, IC B, IC C are used to calculate the stage latency for the current iteration of stage 1. The stage latency of the current iteration of stage 1 can be calculated by applying a MIN, MAX, AVERAGE, and/or SUM function on the instrumentation counts reported by the instrumentation counters IC A, IC B, IC C (for the AVERAGE implementation the divisor is the number of stage buffers). Similarly, a plurality of stage latencies can be calculated for the thousand iterations of stage 1 for the batch of thousand images. A cumulative stage latency for stage 1 can be calculated by applying the MIN, MAX, AVERAGE, and/or SUM function on the plurality of stage latencies (for the AVERAGE implementation the divisor is the number of stage iterations (determined from batch size or mini-batch size)).

In some implementations, multiple instrumentation counters are simultaneously run for a data processing operation (e.g., compute operations, memory operations, routing operations, and/or control operations). The multiple instrumentation counters can count performance events for multiple, concurrently executed iterations of the data processing operation. For example, turning to FIG. 9, consider that the producer A receives a first vector of a first tensor for a first iteration of the data processing operation and in response releases a first read begun token. The first read begun token triggers a first incrementation counter IC1 A. The producer A receives all the vectors of the first tensor but is yet to receive a first write done token from the consumer L for the first iteration. Before receiving the first write done token, the producer A receives a first vector of a second tensor for a second iteration of the data processing operation and in response releases a second read begun token. The second read begun token triggers a second incrementation counter IC2 A. The producer A receives all the vectors of the second tensor but is yet to receive a second write done token from the consumer L for the second iteration. Before receiving the first and second write done tokens, the producer A receives a first vector of a third tensor for a third iteration of the data processing operation and in response releases a third read begun token. The third read begun token triggers a third incrementation counter IC3 A. Accordingly, three incrementation counters IC1 A, IC2 A, IC3 A are counting in parallel for respective iterations of the data processing operation, albeit activated at different clock cycles. Upon receiving the first write done token at the producer A, the first incrementation counter IC1 A is closed and its count reported to calculate the stage latency for the first iteration. Upon receiving the second write done token at the producer A, the second incrementation counter IC2 A is closed and its count reported to calculate the stage latency for the second iteration. Upon receiving the third write done token at the producer A, the third incrementation counter IC3 A is closed and its count reported to calculate the stage latency for the third iteration.

In some implementations, the outputs of the incrementation counters (e.g., the counts) are reported to a host (e.g., via PCIe bus). In one implementation, an instrumentation counter connects a plurality of performance counters in a daisy chain, and the host then reads the data collected by these counters, for example, via the PCIe control register access (CRA) or control and status register (CSR) port.

In some implementations, these three counts are counted on a same instrumentation counter. In other implementations, these three counts are counted on respective or different instrumentation counters. In one implementation, the respective or different instrumentation counters are implemented on respective or different instrumentation units. In some implementations, the respective or different instrumentation units are operatively coupled to respective or different configurable units. In some implementations, the respective or different instrumentation units are operatively coupled to a same configurable unit. In another implementation, the respective or different instrumentation counters are implemented on a same instrumentation unit. A single configurable unit can have one or more instrumentation units that can be concurrently, synchronously, and asynchronously operated on the single configurable unit. A single instrumentation unit can concurrently, synchronously, and asynchronously run one or more instrumentation counters.

In some implementations, the configurable units are configured to trigger start events and stop events that start and stop the incrementation counters in response to combining multiple control signals based on control and data dependencies defined by the compile time logic 132. Above, we discussed the scenario in which the producer A releases a read begun token for a current iteration in response to satisfaction of a single condition or dependency: receiving a unit of data for the current iteration. In other implementations, the producer A is configurable to release the read begun token for the current iteration in response to satisfaction of two conditions or dependencies: (i) receiving the unit of data for the current iteration, and (ii) receiving a write done token from the consumer L for a preceding iteration. In such a case, the incrementation counter for the producer A may experience some stalled cycles waiting for the second condition to be satisfied. The second condition ensures that execution of the previous iteration is completed before execution of the current iteration begins (also prevents buffer overflow).

In another example, two producers with a shared consumer can be configured such that the two producers receive inputs at different rates and latencies. In such a case, the incrementation counter of the faster of the two producers experiences many dead cycles for a current iteration. To prevent that, the faster producer can be configured to release the read begun token in response to satisfaction of two conditions or dependencies: (i) receiving a unit of data for the current iteration, and (ii) receiving a read begun token (or synchronization token) from the slower producer for the current iteration. The second condition ensures that incrementation counters of the two producers are triggered at the same time for a same iteration, i.e., synchronized, or are within few clock cycles, and therefore prevents the incrementation counter of the faster producer from falsely reporting dead counts (which are in fact caused by the slower producer).

Figure 10:
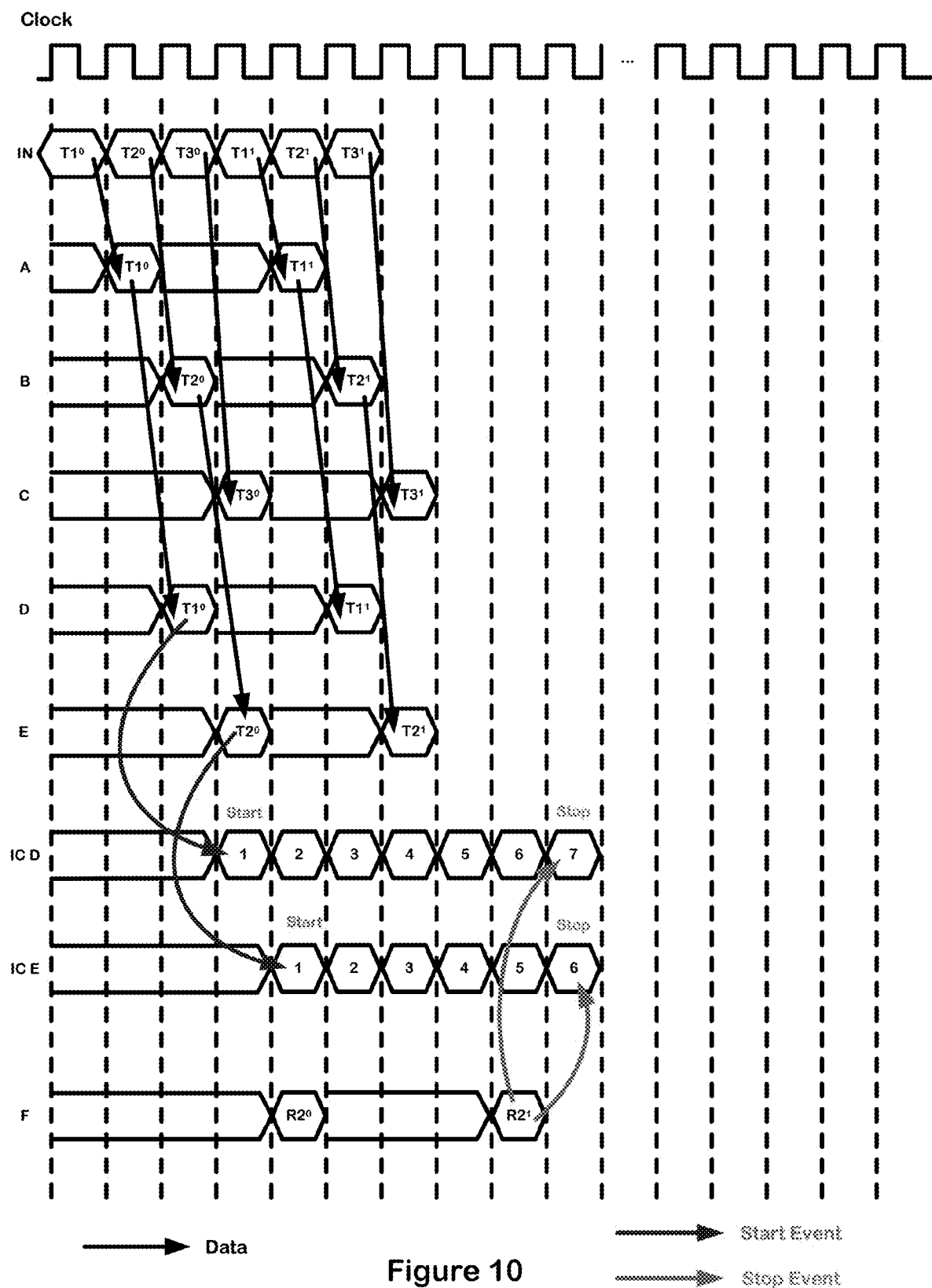
FIG. 10 is a timing diagram of determining stage latency of an iteration of a first stage of an inner loop of the dataflow graph using instrumentation counters.

FIG. 10 is a timing diagram of determining stage latency of an iteration of a first stage 1.0 of the inner loop 409 of the dataflow graph 400 using instrumentation counters. Stage 1.0 has two producers D and E and one consumer F. Incrementation counters IC D and IC E are sequentially triggered when the producers D and E sequentially release respective read begun tokens (depicted as start events in blue), and concurrently terminated when they respectively receive a write done token from the consumer F (depicted as stop events in magenta).

The instrumentation counts reported by the instrumentation counters IC D and IC E are used to calculate the stage latency for the current iteration of stage 1.0. The stage latency of the current iteration of stage 1.0 can be calculated by applying a MIN, MAX, AVERAGE, and/or SUM function on the instrumentation counts reported by the instrumentation counters IC D and IC E (for the AVERAGE implementation the divisor is the number of stage buffers). Similarly, a plurality of stage latencies can be calculated for the thousand iterations of stage 1.0 for the batch of one thousand images. A cumulative stage latency for stage 1.0 can be calculated by applying the MIN, MAX, AVERAGE, and/or SUM function on the plurality of stage latencies (for the AVERAGE implementation the divisor is the number of stage iterations (determined from batch size or mini-batch size)).

Single Producer, Single Consumer

Figure 11:
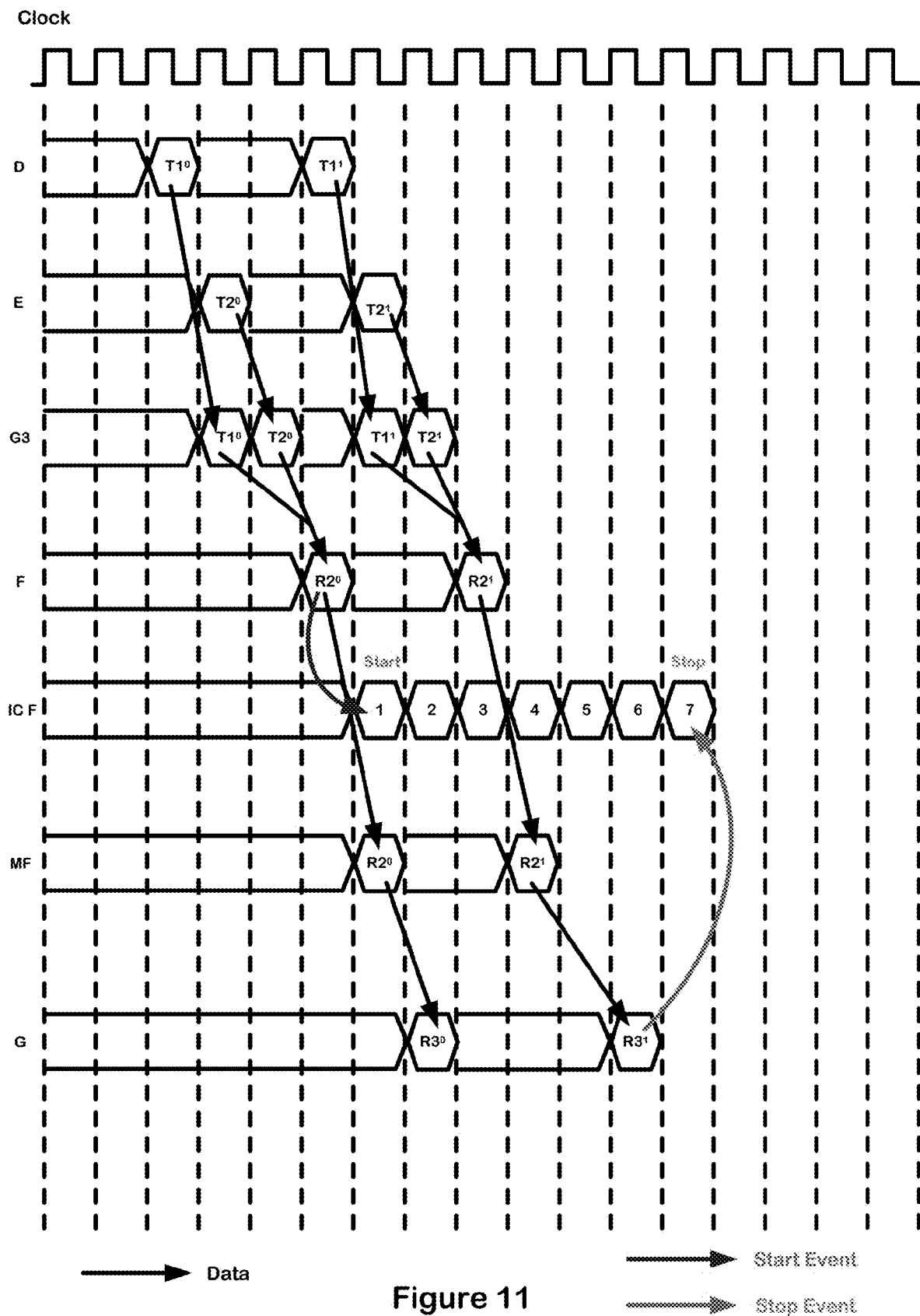
FIG. 11 is a timing diagram of determining stage latency of an iteration of a second stage of the inner loop of the dataflow graph using an instrumentation counter.

FIG. 11 is a timing diagram of determining stage latency of an iteration of a second stage 1.1 of the inner loop 409 of the dataflow graph 400 using an instrumentation counter. Stage 1.1 has one producer F and one consumer G. Incrementation counter IC F is triggered when the producer F releases a read begun token (depicted as a start event in blue) and terminated when the producer F receives a write done token from the consumer G (depicted as a stop event in magenta).

The instrumentation counts reported by the instrumentation counter IC F are used to calculate the stage latency for the current iteration of stage 1.1. A plurality of stage latencies can be calculated for the thousand iterations of stage 1.1 for the batch of one thousand images. A cumulative stage latency for stage 1.1 can be calculated by applying the MIN, MAX, AVERAGE, and/or SUM function on the plurality of stage latencies (for the AVERAGE implementation the divisor is the number of stage iterations (determined from batch size or mini-batch size)).

Figure 12:
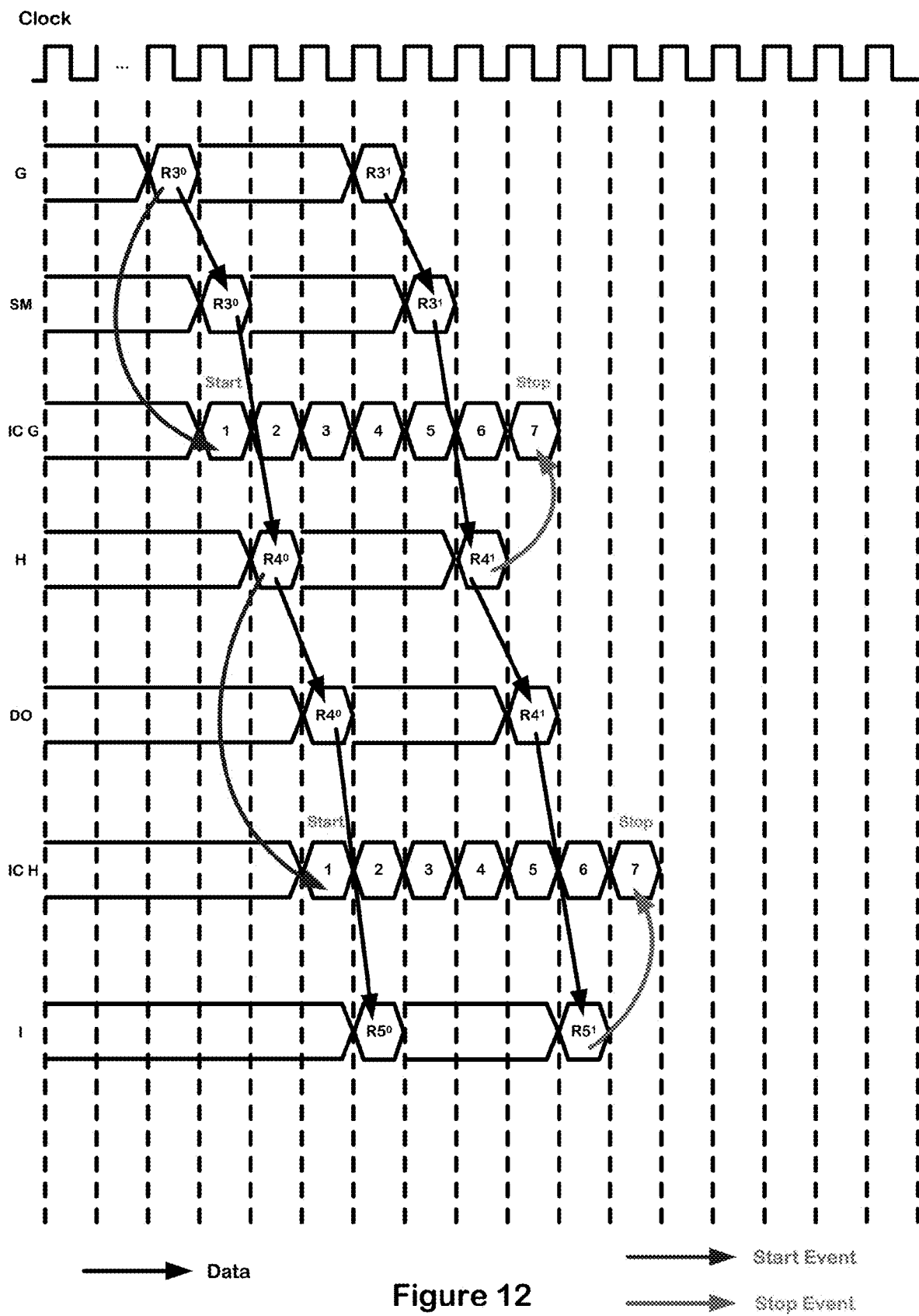
FIG. 12 is a timing diagram of determining stage latencies of an iteration of third and fourth stages of the inner loop of the dataflow graph using instrumentation counters.

FIG. 12 is a timing diagram of determining stage latencies of an iteration of third and fourth stages 1.2 and 1.3 of the inner loop 409 of the dataflow graph 400 using instrumentation counters. Stage 1.2 has one producer G and one consumer H. Incrementation counter IC G is triggered when the producer G releases a read begun token (depicted as a start event in blue) and terminated when the producer G receives a write done token from the consumer H (depicted as a stop event in magenta).

The instrumentation counts reported by the instrumentation counter IC G are used to calculate the stage latency for the current iteration of stage 1.2. Similarly, a plurality of stage latencies can be calculated for the thousand iterations of stage 1.2 for the batch of one thousand images. A cumulative stage latency for stage 1.2 can be calculated by applying the MIN, MAX, AVERAGE, and/or SUM function on the plurality of stage latencies (for the AVERAGE implementation the divisor is the number of stage iterations (determined from batch size or mini-batch size)).

Stage 1.3 has one producer H and one consumer I. Incrementation counter IC H is triggered when the producer H releases a read begun token (depicted as a start event in blue) and terminated when the producer H receives a write done token from the consumer I (depicted as a stop event in magenta).

The instrumentation counts reported by the instrumentation counter IC H are used to calculate the stage latency for the current iteration of stage 1.3. A plurality of stage latencies can be calculated for the thousand iterations of stage 1.3 for the batch of one thousand images. A cumulative stage latency for stage 1.3 can be calculated by applying the MIN, MAX, AVERAGE, and/or SUM function on the plurality of stage latencies (for the AVERAGE implementation the divisor is the number of stage iterations (determined from batch size or mini-batch size)).

Synchronization Events

Figure 13:
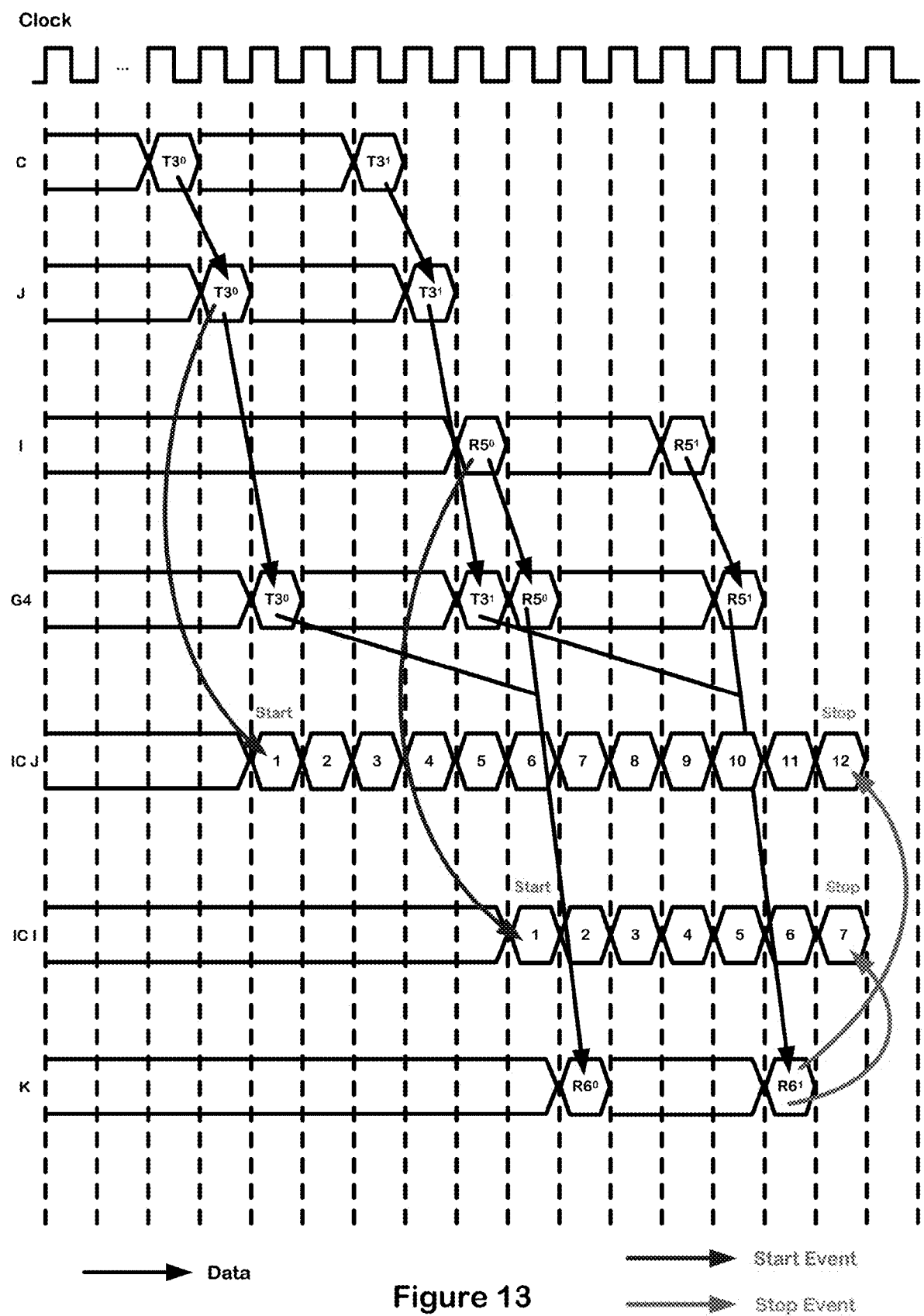
FIG. 13 is a timing diagram of determining stage latency of an iteration of a fifth stage of the inner loop of the dataflow graph using instrumentation counters.

FIG. 13 is a timing diagram of determining stage latency of an iteration of a fifth stage 1.4 of the inner loop 409 of the dataflow graph 400 using instrumentation counters. Stage 1.4 has two producers J and I and one consumer K. Incrementation counters IC J and IC I are sequentially triggered when the producers J and I sequentially release respective read begun tokens (depicted as start events in blue), and concurrently terminated when they respectively receive a write done token from the consumer K (depicted as stop events in magenta).

Figure 14:
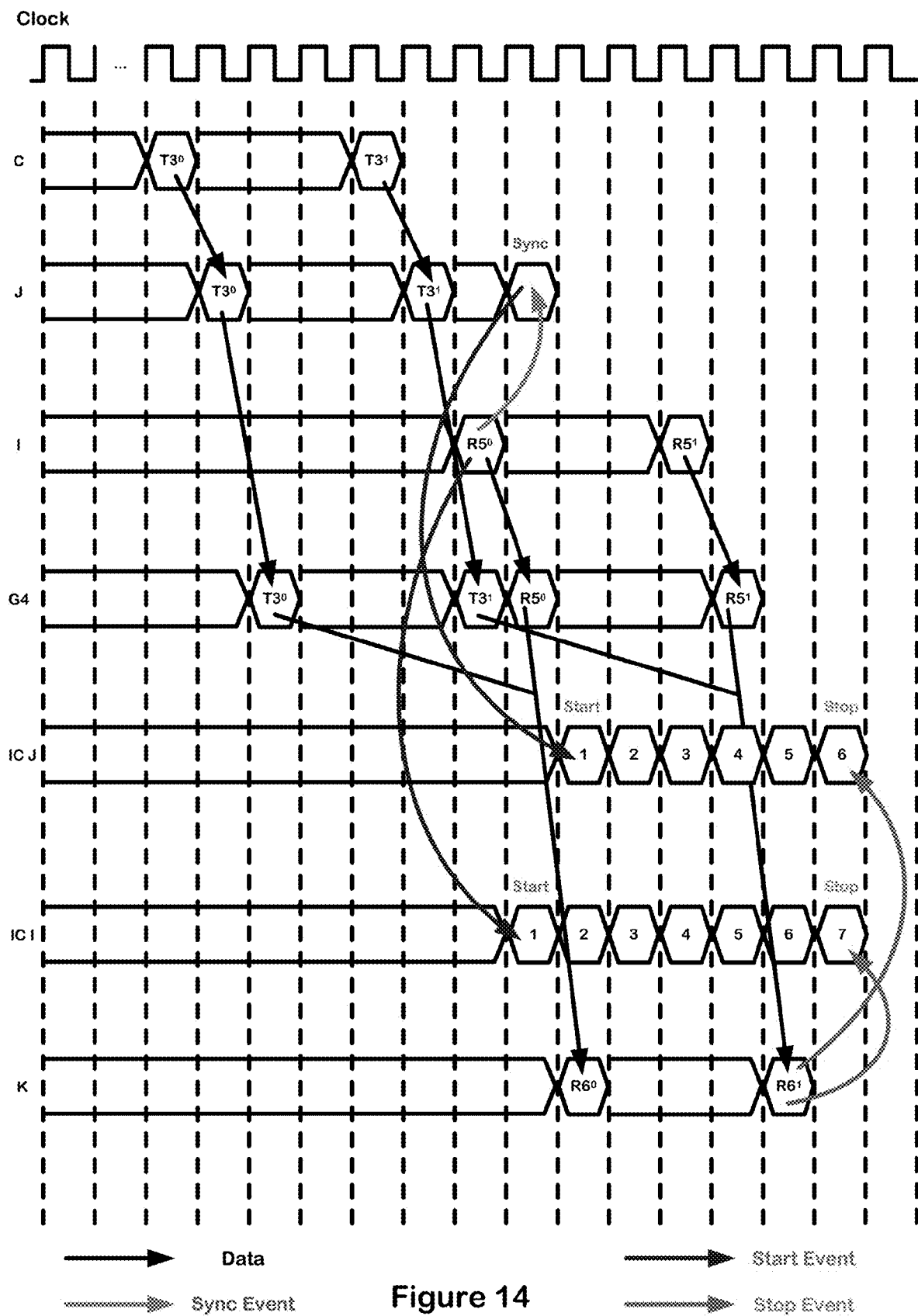
FIG. 14 is a timing diagram of determining stage latency of an iteration of the fifth stage of the inner loop of the dataflow graph using the instrumentation counters and synchronization tokens.

FIG. 14 is a timing diagram of determining stage latency of an iteration of the fifth stage 1.4 of the inner loop 409 of the dataflow graph 400 using instrumentation counters and synchronization tokens. Producer J receives its input directly from the stage buffer C. In contrast, producer I receives its input after a cascade of processing done by stages 1.0, 1.1 and 1.3. This causes producer J to receive its input for a current iteration much sooner than producer I. To synchronize the incrementation counters IC J and IC I, a synchronization token (depicted in green) is released by the producer I in response to receiving a unit of data for the current iteration. The producer I concurrently releases the synchronization token in conjunction with its read begun token. As illustrated, the producer J does not release its read begun token when it receives a unit of data for the current iteration. Instead, the producer J releases its read begun token in response to receiving the synchronization token from the producer I.

The instrumentation counts reported by the instrumentation counters IC J and IC I are used to calculate the stage latency for the current iteration of stage 1.4. The stage latency of the current iteration of stage 1.4 can be calculated by applying a MIN, MAX, AVERAGE, and/or SUM function on the instrumentation counts reported by the instrumentation counters IC J and IC I (for the AVERAGE implementation the divisor is the number of stage buffers). Similarly, a plurality of stage latencies can be calculated for the thousand iterations of stage 1.4 for the batch of one thousand images. A cumulative stage latency for stage 1.4 can be calculated by applying the MIN, MAX, AVERAGE, and/or SUM function on the plurality of stage latencies (for the AVERAGE implementation the divisor is the number of stage iterations (determined from batch size or mini-batch size)).

Single Producer, Multiple Consumers

In some implementations, an instrumentation counter is triggered when a single producer shared by multiple consumers releases a read begun token and terminated (frozen) when each of the multiple consumers has sent its respective write done token to the single producer.

Multiple Producers, Multiple Consumers

In some implementations, instrumentation counters are triggered upon receiving respective read begun tokens from multiple producers and terminated (frozen) when each of the multiple consumers has sent its respective write done token to the multiple producers.

Other Instrumented Events

The instrumentation units are configured to count other performance events such as write and read speeds/bandwidths/rates of configurable units. The instrumentation units are configured to count other performance events such as a number of calculated memory addresses that are within a valid range, to count a number of calculated memory addresses that are less than a minimum address, and/or to count a number of calculated memory addresses that are greater than a maximum address, and to report the counts as the performance measures. The instrumentation units are configured to count other performance events such as a number of instances when multiple memory requests issued to a same processing unit in the array of processing units are queued and sequentially fulfilled, and to report the count as a performance measure. The instrumentation units are configured to count other performance events such as a number of instances when a particular memory request issued to a particular processing unit in the array of processing units is handed off to another processing unit in the array of processing units for fulfillment due to unavailability of the particular processing unit, and to report the count as a performance measure.

The instrumentation units are configured to count other performance events such as a number of elapsed cycles between issuance, handing off, and fulfillment of the particular memory request. The instrumentation units are configured to count other performance events such as a number of memory requests issued to respective memory channels in the plurality of memory channels, and to report the count as a performance measure. The instrumentation units are configured to count other performance events such as a number of instances when multiple memory requests issued to a same memory channel in the plurality of memory channels are queued and sequentially fulfilled, and to report the count as a performance measure. The instrumentation units are configured to count other performance events such as a number of elapsed cycles between issuance, queuing, and sequential fulfillment of the multiple memory requests, and to report the count as a performance measure. The instrumentation units are configured to count other performance events such as a number of instances when a particular memory request issued to a particular memory channel in the plurality of memory channels is handed off to another memory channel in the plurality of memory channels for fulfillment due to unavailability of the particular memory channel, and to report the count as a performance measure.

Other examples of events instrumented by the disclosed instrumentation counters can be found in IBM, "POWER9 Performance Monitor Unit User's Guide," *OpenPOWER*, Version 1.2, 28 Nov. 2018, accessible at https://wiki.raptores.com/w/images/6/6b/POWER9_PMU_UG_v12_28NOV2018_pub.pdf, which is incorporated by reference as if fully set forth herein.

Other examples of events instrumented by the disclosed instrumentation counters can be found in Intel, "Intel® FPGA SDK for Pro Edition: Best Practices Guide," Version 20.4, 14 Dec. 2020, accessible at https://www.intel.com/content/dam/www/programmable/us/en/pdfs/literature/hb/opencl-sdk/aocl-best-practices-guide.pdf, which is incorporated by reference as if fully set forth herein.

Other examples of events instrumented by the disclosed instrumentation counters can be found in Prabhakar et al., "Plasticine: A Reconfigurable Architecture for Parallel Patterns," ISCA '17, Jun. 24-28, 2017, Toronto, ON, Canada and Koeplinger et al., "Spatial: A Language and Compiler for Application Accelerators," *Proceedings Of The 39th ACM SIGPLAN Conference On Programming Language Design And Implementation* (PLDI), Proceedings of the 43rd International Symposium on Computer Architecture, 2018, which are incorporated by reference as if fully set forth herein, and include counts like number of instances of linear accesses, tiled accesses, streaming accesses, random reads/writes to DRAM, dense and sparse requests etc., and how long each took.

Instrumentation Network and Instrumentation Units

Figure 15:
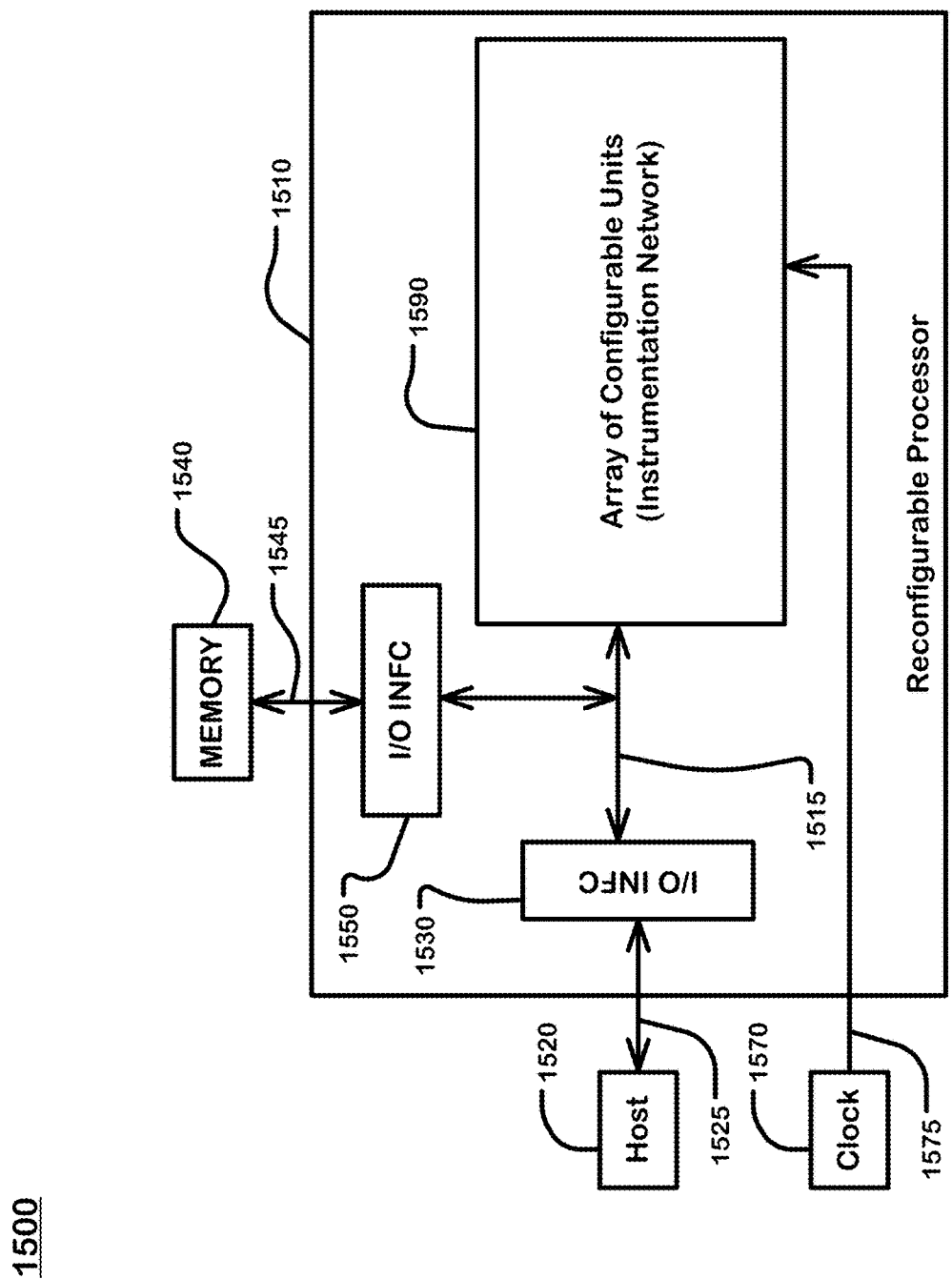
FIG. 15 is a system diagram illustrating a system including a host, a memory, and a reconfigurable data processor including an instrumentation network.

FIG. 15 is a system diagram illustrating a system including a host, a memory, and a reconfigurable data processor including an instrumentation network. As shown in the example of FIG. 15, the reconfigurable data processor 1510 includes an array 1590 of configurable units that includes an instrumentation network as described herein.

The processor 1550 includes an external I/O interface 1530 connected to the host 1520 by lines 1525, and external I/O interface 1550 connected to the memory 1540 by lines 1545. The I/O interfaces 1530, 1550 connect via a bus system 1515 to the array 1590 of configurable units. The bus system 1515 may have a bus width of carrying one chunk of data which can be, for this example, 1528 bits (references to 1528 bits throughout can be considered as an example chunk size more generally).

To configure configurable units in the array 1590 of configurable units with a configuration file, the host 1520 can send the configuration file to the memory 1540 via the interface 1530, the bus system 1515, and the interface 1550 in the reconfigurable data processor 1510. The configuration file can be loaded in many ways, as suits a particular architecture, including in data paths outside the configurable processor 1510. The configuration file can be retrieved from the memory 1540 via the memory interface 1550. Chunks of the configuration file can then be sent in a distribution sequence to configurable units in the array 1590 of configurable units in the reconfigurable data processor 1510.

An external clock generator 1570 or other clock signal sources can provide a clock signal 1575 or clock signals to elements in the reconfigurable data processor 1510, including the array 1590 of configurable units, and the bus system 1515, and the external data I/O interfaces 1550. The configurable units in the array 1590 can be configured to execute the execution fragments.

The instrumentation network is configurable to establish control signal routes among the configurable units usable for coordination of the execution fragments and measure stage latencies and other performance measures. The instrumentation network is configurable in configurable and reconfigurable architectures to provide signal routing suitable to support complex data processing operations in an array of configurable units, including for example in configurable units of a CGRA processor.

The instrumentation network provides the ability to register or record inbound tokens and status signals from several distinct sources on the CGRA, which can be defined in a configuration data store, and produce output tokens, and other signals, based on specified combinations of the inbound tokens and status signals. Examples described herein are flexible enough to support control across an arbitrary number of sources by decomposing the instrumentation logic into multiple levels.

An instrumentation network as described herein can be utilized with other types of data processors that include an array of processing units which perform execution fragments that may require coordination for the purposes of a broader data processing operation.

Figure 16A:
FIG. 16A illustrates an example switch unit connecting elements in an array level network and including an associated instrumentation unit.
Figure 16:
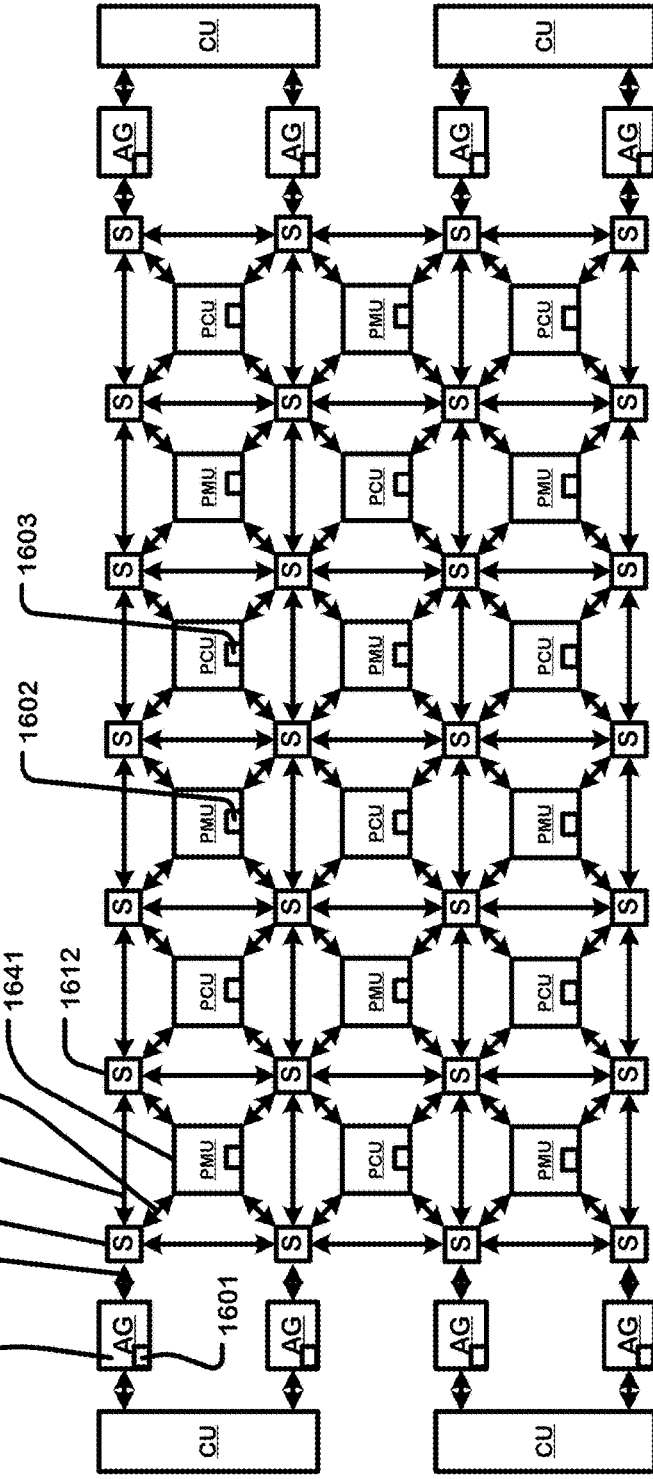
FIG. 16 is a simplified diagram of a tile comprising an array of configurable units with associated instrumentation units.

FIG. 16 is a simplified diagram of a tile comprising an array of configurable units with associated instrumentation units. In this example, the array of configurable units 1600 includes a plurality of types of configurable units. The types of configurable units, in this example, include Pattern Compute Units (PCU), Pattern Memory Units (PMU), switch units (S), and Address Generation and Coalescing Units (each including two address generators AG and a shared CU). For an example of the functions of these types of configurable units, see, Prabhakar et al., "Plasticine: A Reconfigurable Architecture For Parallel Patterns", ISCA '17, June 24-28, 2017, Toronto, ON, Canada, which is incorporated by reference as if fully set forth herein. Each of these configurable units contains a configuration store comprising a set of registers or flip-flops storing configuration data that represent either the setup or the sequence to run a program, and can include the number of nested loops, the limits of each loop iterator, the instructions to be executed for each stage, the source of the operands, and the network parameters for the input and output interfaces.

Additionally, each of these configurable units contains a configuration store comprising a set of registers or flip-flops that store a status usable to track progress in nested loops or otherwise. A configuration file contains a bit stream representing the initial configuration, or starting state, of each of the components that execute the program. This bit stream is referred to as a bit file. Program Load is the process of setting up the configuration stores in the array of configurable units based on the contents of the bit file to allow all the components to execute a program (i.e., a machine). Program Load may also require the load of all PMU memories.

The bus system includes links interconnecting configurable units in the array. The links in the array level network include one or more, and in this case two, kinds of physical data buses: a chunk-level vector bus (e.g., 128 bits of data), and a word-level scalar bus (e.g., 32 bits of data). For instance, interconnect 1621 between switch units 1611 and 1612 includes a vector bus interconnect with vector bus width of 128 bits, and a scalar bus interconnect with a scalar bus width of 32 bits. Also, a control bus (see FIG. 16) that can comprise a configurable interconnect is included carrying multiple control bits on signal routes designated by configuration bits in the configuration file for the tile. The control bus can comprise physical lines separate from the data buses in some implementations. In other implementations, the control bus can be implemented using the same physical lines with a separate protocol or in a time sharing procedure.

The physical buses differ in the granularity of data being transferred. In one implementation, the vector bus can carry a chunk that includes 16-Bytes (=128 bits) of data as its payload. The scalar bus can have a 32-bit payload and carry scalar operands or control information. The control bus can carry control handshakes such as tokens and other signals. The vector and scalar buses can be packet-switched, including headers that indicate a destination of each packet and other information such as sequence numbers that can be used to reassemble a file when the packets are received out of order. Each packet header can contain a destination identifier that identifies the geographical coordinates of the destination switch unit (e.g., the row and column in the array), and an interface identifier that identifies the interface on the destination switch (e.g., North, South, East, West, etc.) used to reach the destination unit.

FIG. 16A illustrates an example switch unit connecting elements in an array level network. As shown in the example of FIG. 16A, a switch unit can have 8 interfaces. The North, South, East and West interfaces of a switch unit are used for connections between switch units. The Northeast, Southeast, Northwest and Southwest interfaces of a switch unit are each used to make connections to PCU or PMU instances. Two switch units in each tile quadrant have connections to an Address Generation unit and Coalescing Unit (AG CU) that include multiple address generation (AG) units and a coalescing unit (CU) connected to the multiple address generation units. The coalescing unit (CU) arbitrates between the AGs and processes memory requests. Each of the 8 interfaces of a switch unit can include a vector interface, a scalar interface, and a control interface to communicate with the vector network, the scalar network, and the control network. The example switch unit includes an instrumentation unit 1651.

During execution of an execution fragment of a machine after configuration, data can be sent via one or more unit switches and one or more links between the unit switches to the configurable units using the vector bus and vector interface(s) of the one or more switch units on the array level network.

A data processing operation implemented by configuration of a tile comprises a plurality of execution fragments of the data processing operation which are distributed among and executed by corresponding configurable units (AGs, CUs, PMUs, PCUs in this example).

An instrumentation network in this example comprises a plurality of configurable instrumentation logic units coupled with the configurable units in the array. In this example, the plurality of instrumentation logic units includes instrumentation logic units (e.g., 1601) in or operatively coupled to the address generators AG, instrumentation logic units (e.g., 1602) in the PMUs and instrumentation logic units (e.g., 1603) in the PCUs. The instrumentation network for a given data processing operation can be configured to instrument/profile/performance measure/count relationships among the execution fragments, to coordinate timing of the ending and the beginning of the performance of the execution fragments distributed across the tile.

The instrumentation logic units are connected to a control bus that, in this example, is implemented using a configurable interconnect (not shown—see FIG. 16). The control bus can be configured using configuration data to form signal routes among the instrumentation logic units in the tile supporting a particular configuration of the tile designed for performing a data processing operation.

In one implementation, the configurable units include configuration and status registers holding unit configuration files loaded in a configuration load process or unloaded in a configuration unload process. The registers can be connected in a serial chain and can be loaded through a process of shifting bits through the serial chain. In some implementations, there may be more than one serial chain arranged in parallel or in series. When a configurable unit receives the, for example, 128 bits of configuration data in one bus cycle, the configurable unit shifts this data through its serial chain at the rate of 1 bit per cycle, where shifter cycles can run at the same rate as the bus cycle. It will take 128 shifter cycles for a configurable unit to load 128 configuration bits with the 128 bits of data received over the vector interface.

A configuration file or bit file, before configuration of the tile, can be sent using the same vector bus, via one or more unit switches and one or more links between the unit switches to the configurable unit using the vector bus and vector interface(s) of the one or more switch units on the array level network. For instance, a chunk of configuration data in a unit file particular to a configurable unit PMU 1641 can be sent to the PMU 1641, via a link 1620 between a load controller in the address generator AG and the West (W) vector interface of the switch unit 1611, the switch unit 1611, and a link 1631 between the Southeast (SE) vector interface of the switch unit 1611 and the PMU 1641. Configuration data for the instrumentation network can be included in the configuration data for associated configurable units or provided via other configuration data structures.

The configurable units interface with the memory through multiple memory interfaces. Each of the memory interfaces can be accessed using several AGCUs. Each AGCU contains a reconfigurable scalar data path to generate requests for the off-chip memory. Each AGCU contains FIFOs (first-in-first-out buffers for organizing data) to buffer outgoing commands, data, and incoming responses from the off-chip memory.

Configuration files can be loaded to specify the configuration of the tile including instrumentation logic units and the control bus, for the purposes of particular data processing operations, including execution fragments in the configurable units, interconnect configurations and instrumentation network configurations. Technology for coordinating the loading and unloading of configuration files is described in commonly owned U.S. patent application Ser. No. 16/197,826, filed Nov. 21, 2018, entitled Configuration Load of a Reconfigurable Data Processor, by Shah et al., which is incorporated by reference as if fully set forth herein.

Figure 17:
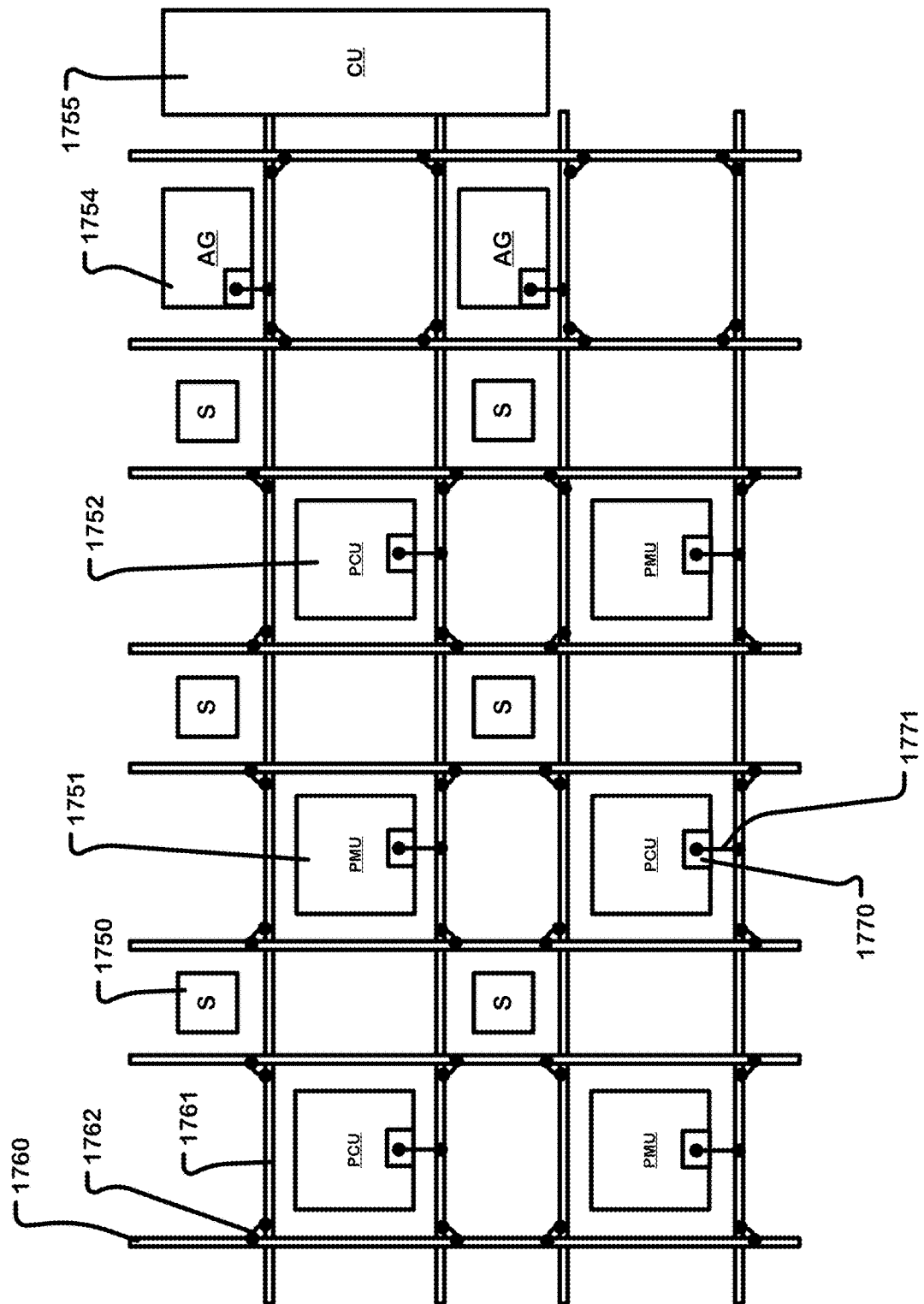
FIG. 17 is a diagram of a portion of a tile like that of FIG. 16 illustrating a configurable interconnect connected to instrumentation units in the tile.

FIG. 17 illustrates a portion of the tile (upper right portion of FIG. 16), with the data network removed, and shows a part of the control bus, including the configurable interconnect usable for forming signal routes among the instrumentation logic units. The plurality of configurable units in the illustrated portion of the array includes switches S (e.g., 1750), PMUs (e.g., 1751), PCUs (e.g., 1752), AGs (e.g., 1754) and a CU (e.g., 1755). Instrumentation logic units (e.g., 1770) are included in configurable units in the array. In this example, all of the configurable units except the switches S and the coalescing unit CU include instrumentation logic units. In other examples, different distributions of the instrumentation logic units can be utilized, including examples in which the instrumentation logic units are connected to more than one configurable unit in the array, and examples in which the instrumentation logic units are connected to all the configurable units (e.g., including the S and CU type units in the illustrated example).

The configurable interconnect is illustrated by a grid of vertical conductors (e.g., 1760) intersected by horizontal conductors (e.g., 1761). Switch boxes (e.g., 1762) are set by configuration data to interconnect specific lines or sets of lines in the horizontal conductors with the vertical conductors at each intersection. Likewise, each of the configurable units can include inputs and outputs (not shown) for control signals to be routed using the configurable interconnect that can be configured to connect to particular lines in the horizontal and vertical conductors.

In this implementation, each of the instrumentation logic units (e.g., 1770) includes a plurality of inputs and outputs (e.g., 1771) which are configurable for connection to particular lines in the horizontal conductors of the interconnect. In the illustration, the connections between the instrumentation logic units in the configurable interconnect are made with horizontal conductors in the configurable interconnect. This illustration does not suggest any limitation on the implementation and distribution of configurable connections that can be made with the configurable interconnect and the instrumentation logic units.

The configurable switches can be implemented generally using pass gates with control inputs connected to a register storing a bit of the configuration file for the control barrier logic unit. In some implementations, the configurations form static routes persistent throughout execution of a data processing operation among the inputs and outputs of the instrumentation logic units to establish instrumentation networks implemented to support particular data processing operations and the execution fragments distributed among the configurable units of the tile to support the data processing operations. In other implementations, the configurations may form dynamic routes that change according to the phase of execution of the program, or as a result of control flow predicates (if-then-else constructs), or other dynamic, input-dependent operations that represent control-flow-dependent sequencing of execution fragments.

Figure 18:
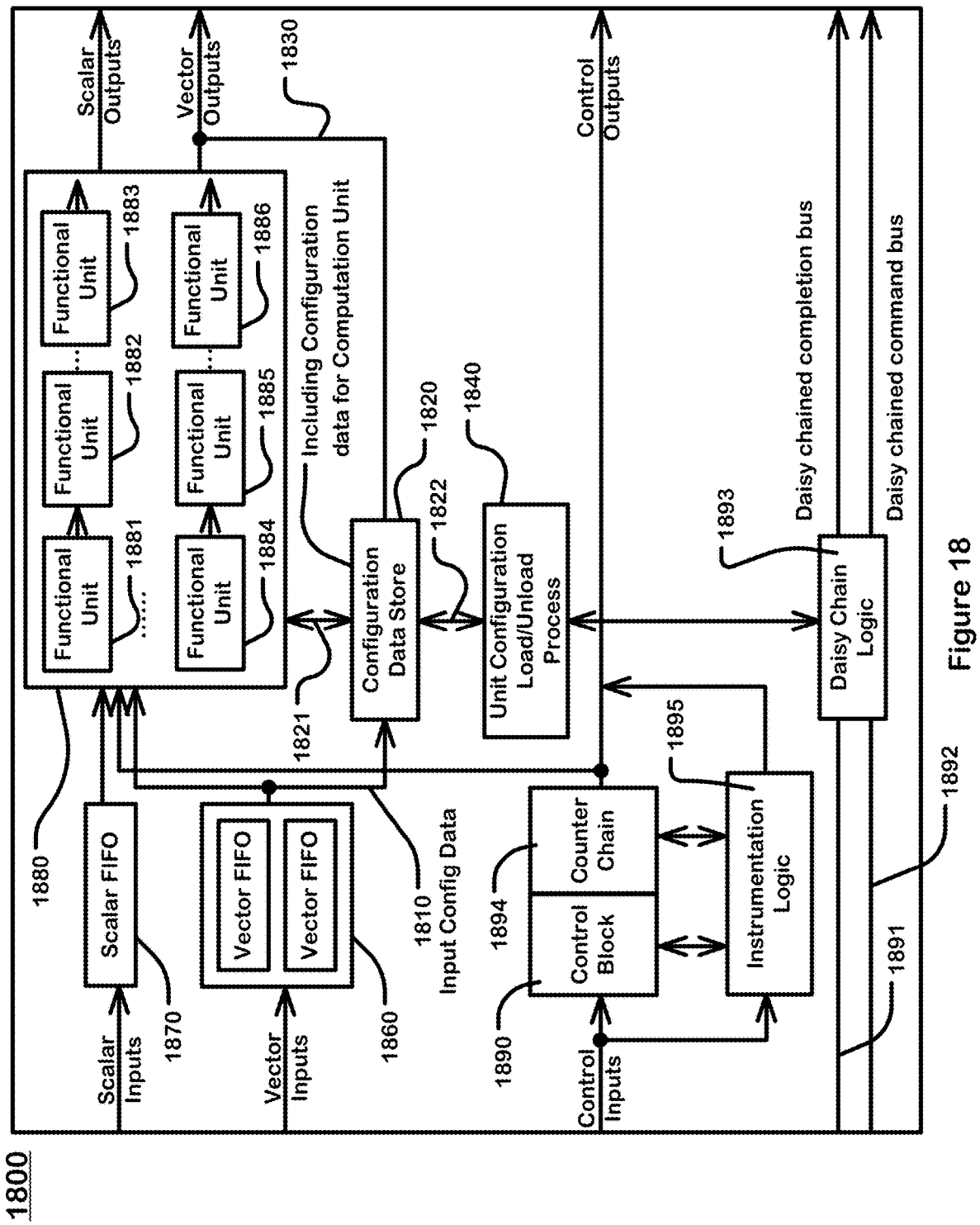
FIG. 18 is a block diagram illustrating an example configurable Pattern Compute Unit (PCU) including an instrumentation logic unit.

FIG. 18 is a block diagram illustrating an example configurable pattern compute unit (PCU) including an instrumentation logic unit. A configurable unit can interface with the scalar, vector, and control buses, in this example using three corresponding sets of inputs and outputs (IO): scalar inputs/outputs, vector inputs/outputs, and control inputs/outputs. Scalar IOs can be used to communicate single words of data (e.g., 32 bits). Vector IOs can be used to communicate chunks of data (e.g., 128 bits), in cases such as receiving configuration data in a unit configuration load process and transmitting and receiving data during operation after configuration across a long pipeline between multiple PCUs. Control IOs can be used to communicate signals on control lines such as the start or end of execution of a configurable unit. Control inputs are received by control block 1890, and control outputs are provided by the control block 1890.

Each vector input is buffered in this example using a vector FIFO in a vector FIFO block 1860 which can include one or more vector FIFOs. Likewise, in this example, each scalar input is buffered using a scalar FIFO 1870. Using input FIFOs decouples timing between data producers and consumers and simplifies inter-configurable-unit control logic by making it robust to input delay mismatches.

A configurable unit includes multiple reconfigurable data paths in block 1880. A data path in a configurable unit can be organized as a multi-stage (Stage 1 . . . Stage N), reconfigurable SIMD (Single Instruction, Multiple Data) pipeline. The chunks of data pushed into the configuration serial chain in a configurable unit include configuration data for each stage of each data path in the configurable unit. The configuration serial chain in the configuration data store 1820 is connected to the multiple data paths in block 1880 via lines 1821.

A configurable data path organized as a multi-stage pipeline can include multiple functional units (e.g., 1881, 1882, 1883, 1884, 1885, 1886) at respective stages. A computation unit or parts of a computation unit can be implemented in multiple functional units at respective stages in a multi-stage pipeline or in multiple multi-stage pipelines. In the example as shown in FIG. 9, a circuit can be implemented in multiple functional units and multiple memory units. Input registers in functional units can register inputs from scalar FIFOs 1870 or Vector FIFOs 1860 or from previous stages in a multi-stage pipeline. A functional unit at a stage in a multi-stage pipeline can execute a function, e.g., logical shift, an arithmetic function, comparison, a logical operation, etc., and generate an output.

Instrumentation logic 1895 is included in this example of a configurable unit. The instrumentation logic 1895 can be part of the control block 1890 or implemented as a separate block on the device. The instrumentation logic 1895 is coupled to the control inputs and to the control outputs. Also, the instrumentation logic 1895 is coupled to the control block 1890 and the counter chain 1894, for exchanging status signals and control signals in support of a control barrier network configured as discussed above.

Configurable units in the array of configurable units include configuration data stores 1820 (e.g., serial chains) to store unit files comprising a plurality of chunks (or sub-files of other sizes) of configuration data particular to the corresponding configurable units. Configurable units in the array of configurable units each include unit configuration load logic 1840 connected to the configuration data store 1820 via line 1822, to execute a unit configuration load process. The unit configuration load process includes receiving, via the bus system (e.g., the vector inputs), chunks of a unit file particular to the configurable unit and loading the received chunks into the configuration data store 1820 of the configurable unit. The unit file loaded into the configuration data store 1820 can include configuration data, including opcodes and routing configuration, for circuits (e.g., module) implementing the instrumentation logic in multiple functional units and multiple memory units, as described herein.

The configuration data stores in configurable units in the plurality of configurable units in this example comprise serial chains of latches, where the latches store bits that control configuration of the resources in the configurable unit. A serial chain in a configuration data store can include a shift register chain for configuration data and a second shift register chain for state information and counter values connected in series.

Input configuration data 1810 can be provided to a vector FIFO as vector inputs, and then be transferred to the configuration data store 1820. Output configuration data 1830 can be unloaded from the configuration data store 1820 using the vector outputs.

The CGRA uses a daisy-chained completion bus to indicate when a load/unload command has been completed. The master AGCU transmits the program load and unload commands to configurable units in the array of configurable units over a daisy-chained command bus. As shown in the example of FIG. 18, a control block 1890, a daisy-chained completion bus 1891 and a daisy-chained command bus 1892 are connected to daisy-chain logic 1893, which communicates with the unit configuration load logic 1840. The daisy-chain logic 1893 can include load complete status logic, as described below. The daisy-chained completion bus is further described below. Other topologies for the command and completion buses are clearly possible but not described here.

Figure 19:
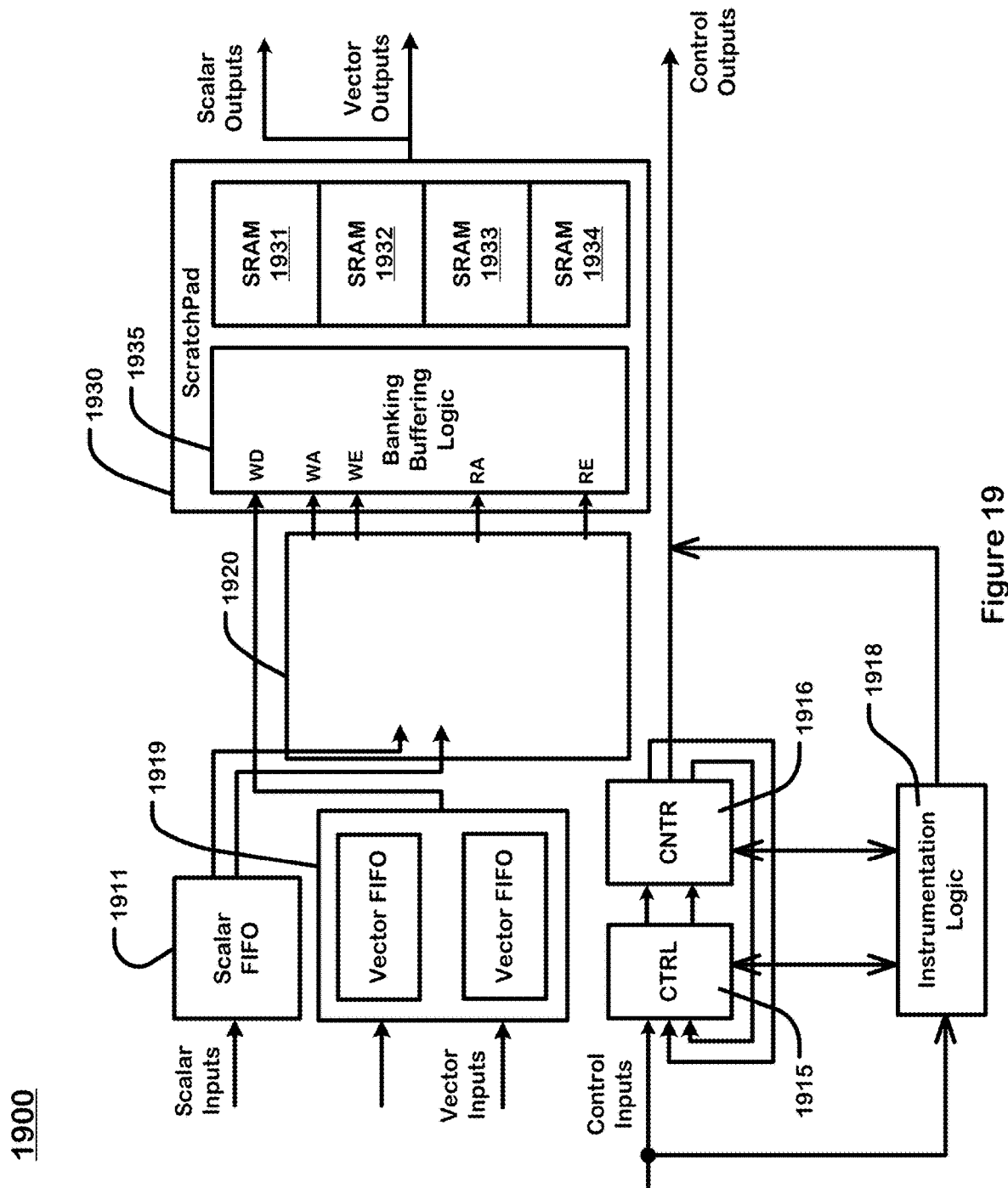
FIG. 19 is a block diagram illustrating an example configurable Pattern Memory Unit (PMU) including an instrumentation logic unit.

FIG. 19 is a block diagram illustrating an example configurable pattern memory unit (PMU) including an instrumentation logic unit. A PMU can contain scratchpad memory 1930 coupled with a reconfigurable scalar data path 1920 intended for address calculation (RA, WA) and control (WE, RE) of the scratchpad memory 1930, along with the bus interfaces used in the PCU (FIG. 18).

The bus interfaces can include scalar inputs, vector inputs, scalar outputs and vector outputs, usable to provide write data (WD). The data path can be organized as a multi-stage reconfigurable pipeline, including stages of functional units (FUs) and associated pipeline registers (PRs) that register inputs and outputs of the functional units. PMUs can be used to store distributed on-chip memory throughout the array of reconfigurable units.

A scratchpad is built with multiple SRAM banks (e.g., 1931, 1932, 1933, 1934). Banking and buffering logic 1935 for the SRAM banks in the scratchpad can be configured to operate in several banking modes to support various access patterns. A computation unit as described herein can include a lookup table stored in the scratchpad memory 1930, from a configuration file or from other sources. In a computation unit as described herein, the scalar data path 1920 can translate a section of a raw input value I for addressing lookup tables implementing a function f(I), into the addressing format utilized by the SRAM scratchpad memory 1930, adding appropriate offsets and so on, to read the entries of the lookup table stored in the scratchpad memory 1930 using the sections of the input value I. Each PMU can include write address calculation logic and read address calculation logic that provide write address WA, write enable WE, read address RA and read enable RE to the banking buffering logic 1935. Based on the state of the local FIFOs 1911 and 1919 and external control inputs, the control block 1915 can be configured to trigger the write address computation, read address computation, or both, by enabling the appropriate counters 1916. A programmable counter chain 1916 (Control Inputs, Control Outputs) and control block 1915 can trigger PMU execution.

Instrumentation logic 1918 is included in this example of a configurable unit. The instrumentation logic 1918 can be part of the control block 1915 or implemented as a separate block on the device. The instrumentation logic 1918 is coupled to the control inputs and to the control outputs. Also, the instrumentation logic 1918 is coupled to the control block 1915 and the counter chain 1916, for exchanging status signals and control signals in support of a control barrier network configured as discussed above.

This is one simplified example of a configuration of a configurable processor for implementing a computation unit as described herein. The configurable processor can be configured in other ways to implement a computation unit. Other types of configurable processors can implement the computation unit in other ways. Also, the computation unit can be implemented using dedicated logic in some examples, or a combination of dedicated logic and instruction-controlled processors.

Figure 20:
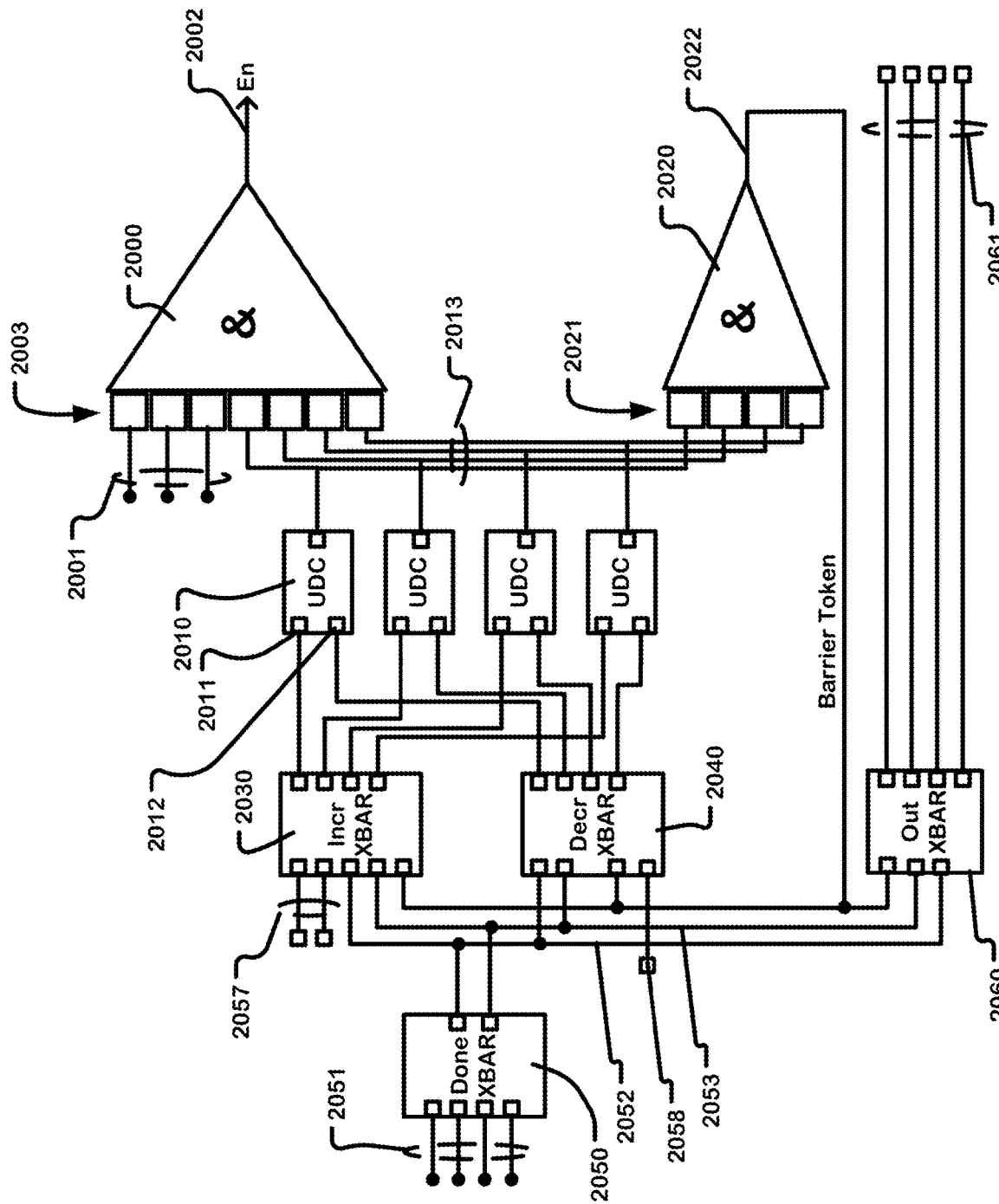
FIG. 20 is a diagram of an implementation of counters implemented by an instrumentation unit.

FIG. 20 illustrates an example of an instrumentation logic unit, usable in an array of configurable units to form a configurable instrumentation network as described herein. The example in FIG. 20 is usable for example as the instrumentation logic of previous figures. The barrier tokens can be used as start and stop events to trigger and terminate instrumentation counters of the instrumentation units.

An instrumentation logic unit includes inputs (e.g., 2001, 2051, 2057) and outputs (e.g., 2002, 2061) which are connected to the control bus (configurable interconnect of FIG. 3) and an associated configurable unit, such as a PCU, PMU, AG of the examples described above.

The instrumentation logic unit (or instrumentation unit) includes a token store that comprises in this example a plurality of up/down counters UDC (e.g., 2010). In other embodiments, different types of latches, such as set/reset SR latches and the like, can be used to implement the token store. In still other embodiments, various implementations of FIFO buffers can be used to implement the token store. Each of the UDCs has an increment input (e.g., 2011) and a decrement input (e.g., 2012). The increment input can be used to change a logic 0 stored in the UDC to a logic 1, or in other words to set the value in the token store. The decrement input can be used to change the logic 1 stored in the UDC to a logic 0, or in other words to reset the value in the token store.

The token store is coupled to a configurable input circuit, which in this example comprises a plurality of configurable crossbar switches. A status crossbar 2050 of the configurable input circuit has inputs 2051 connected to signals usable to indicate the status of an execution fragment in a configurable unit in the array. In this example, the status signals can comprise counter done signals from the plurality of counters in the associated configurable unit that can be used to indicate the status of an execution fragment. The status crossbar 2050 includes outputs 2052, 2053 which are connectable to an increment crossbar 2030 and a decrement crossbar 2040.

The increment crossbar 2030 of the configurable input circuit provides increment signals to each of the UDCs in the token store and has inputs 2057 connected to the configurable interconnect of the control bus, and inputs connected to the outputs of the status crossbar 2050. Thus, each UDC has an increment signal based on a configurable selection of outputs from the status crossbar 2050 and from the configurable interconnect inputs 2057. The increment crossbar also has an input connected to receive a barrier token on line 2052 generated by barrier logic 2020 as discussed below.

The decrement crossbar 2040 of the configurable input circuit provides decrement signals to each of the UDCs in the token store and has an input 2058 (or inputs) connected to the configurable interconnect of the control bus, and inputs connected to the 2052, 2053 of the status crossbar 2050. Thus, each UDC has a decrement signal based on a configurable selection of outputs from the status crossbar 2050 and from the configurable interconnect inputs 2058. The decrement crossbar also has an input connected to receive a barrier token on line 2022 generated by barrier logic 2020 as discussed below.

The instrumentation logic unit includes enable logic 2000 including a configurable enable mask 2003 which generates an enable signal on line 2002 for connection to an associated configurable logic unit based on a configurable combination of the signals in the token store and status signals from the associated configurable logic unit. For example, the enable signal on line 2002 can be provided to the control block 1970 of FIG. 19, which can include logic to generate control signals for the PCU utilizing the enable signal on line 2002 to start and stop execution fragments. The inputs to the enable logic 2000 include status signals on line 2001 from the associated configurable unit, such as FIFO not empty signals, and the like. Also, inputs to the enable logic 2000 can include the outputs (e.g., 2013) of the token store. The enable signal on line 2002 therefore can be generated based on a configurable combination of the outputs of the token store. Also, the enable signal on line 2002 can be generated based on the configurable combination of the outputs of the token store and status signals from the associated configurable unit.

The instrumentation logic unit includes barrier token logic 2020 including a configurable barrier mask 2021 which generates a barrier token on line 2022 based on a configurable combination of the signals on lines 2013 stored in the token store. The barrier token on line 2022 is fed back as a feedback signal to the decrement crossbar 2040, usable to reset the token store, for example. Also, the barrier token on line 2022 is applied as an input to the increment crossbar 2030 in this example, usable as a condition for setting a value in the token store.

The instrumentation logic unit includes an output crossbar 2060. The inputs to the output crossbar in this example include the barrier token on line 2022, and status signals output by the status crossbar 20200. Other inputs can be provided to the output crossbar 2060 as well in other implementations. The output crossbar is configurable to apply the barrier token from line 2022 and other signals to selected lines 2061 on the configurable interconnect. The selected lines 2061 on the configurable interconnect can be configured in a signal route that supplies the barrier token as an input (e.g., input 2057) of another instrumentation logic unit in the instrumentation network of the configurable logic array. The selected lines 2061 on the configurable interconnect can be configured in a signal route that supplies a status signal from one of the configurable units as an input (e.g., input 2057) of another instrumentation logic unit in the instrumentation network of the configurable logic array.

Utilizing an instrumentation logic unit, the barrier operation works as follows. Each unit can be configured to implement a barrier across all the signals that can increment the UDCs. This includes the external control inputs from the control bus sourced from outside the associated configurable unit, and internal status signals like counter done signals sourced from inside the associated configurable unit. To implement a barrier across a subset of these signals, the configuration file reserves one zero-initialized UDC in the token store for each signal in the subset. The crossbars are configured to route the required signals to their respective UDCs. Next, a barrier mask is configured to select the reserved UDCs. The mask selects the UDCs that participate in an AND tree. The output of the AND tree is a 1-bit barrier token which, for example, goes high when all the UDCs in the mask have a value greater than zero. The barrier token can be configured to decrement all the UDCs participating in the barrier. This ensures that the barrier signal is high for only one cycle for every set of input tokens, thus producing one output token. The resulting barrier token is sent out on the control output by programming the "out" crossbar. This token can then be used as required by the program, e.g., input to the next stage of computation, or to the next barrier node, etc. In some cases, the barrier token may have to be sent to the node locally as well. To facilitate this use case, the barrier token is also an entry into the increment crossbar (Xbar) which can increment other UDCs. In this configuration, the barrier token is used for the purposes of resetting the token store. In other embodiments, different signals can be used for that purpose. Also, the barrier token can be used to reset only one bit, or only some of the bits, in the token store, rather than all bits.

This provides maximum flexibility to software to implement instrumentation close to the consumer to better utilize resources.

Control tokens from multiple sources in an array of configurable units often need to be synchronized at a barrier, where a single token (control pulse) is produced after receiving one token from each source. This barrier requirement is shown pictorially by the example of signal routing in FIG. 21 which can be implemented using instrumentation logic units as described herein.

Figure 21:
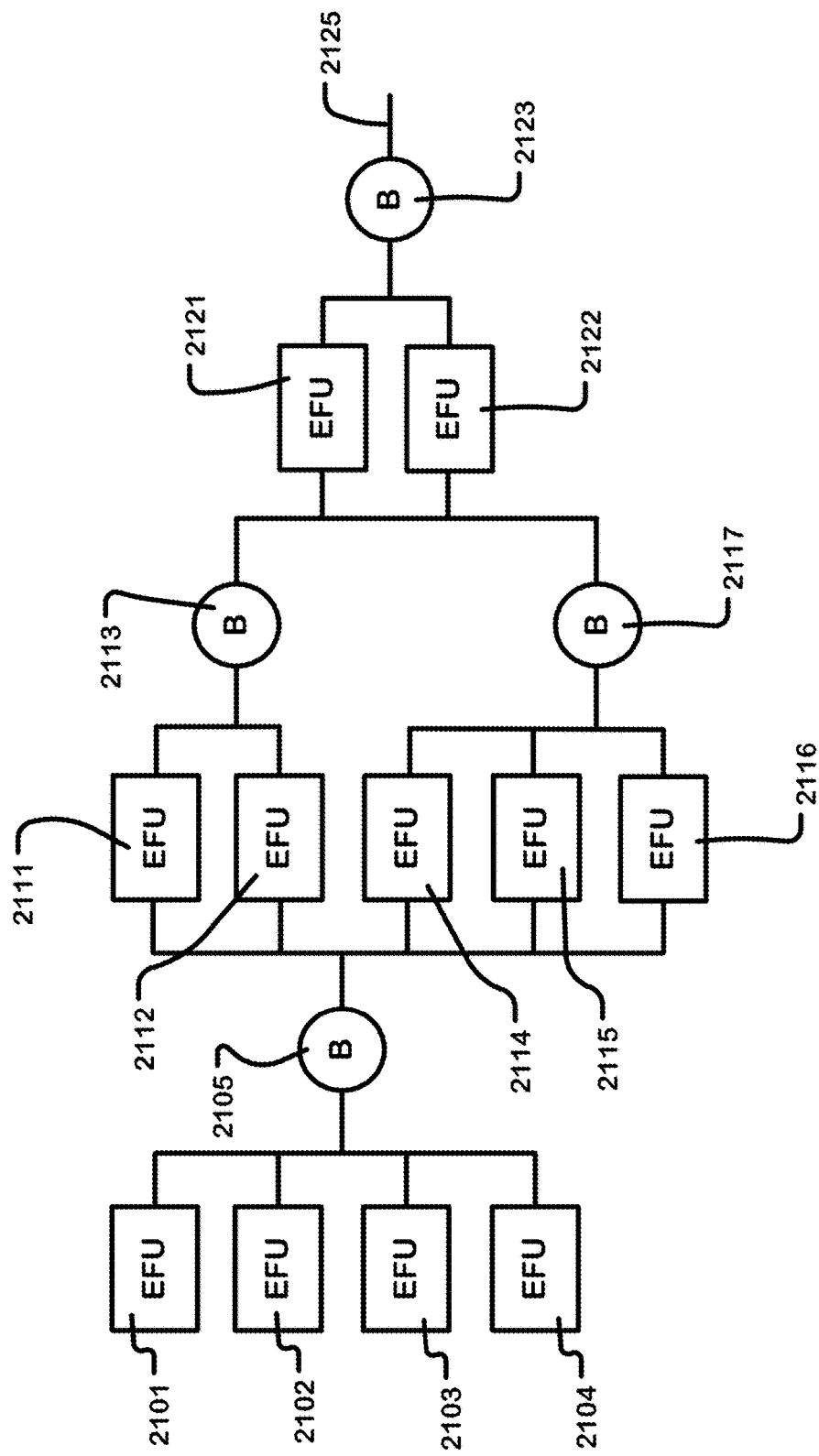
FIG. 21 illustrates an example of execution fragments and signal route that can be implemented using an instrumentation network as described herein.

FIG. 21 illustrates an example of execution fragments and signal route that can be implemented using an instrumentation network as described herein. In FIG. 21, configurable units including configurable logic units are referred to as execution fragment units (EFUs). The network includes three layers of EFUs. The first layer includes 4 EFUs (2101-2104) having outputs that are combined to form a first level barrier 2105. Control barrier logic associated with each can be configured to produce a barrier token which is routed to a second level including EFU 2111 and EFU 2112 having outputs which are combined to provide a barrier 2113, and EFUs 2114-2116 having outputs which are combined to provide a barrier 2117. The barrier tokens can be used as start and stop events to trigger and terminate instrumentation counters of the instrumentation units.

In one configuration, the control barrier logic associated with EFUs 2111 and 2112 is configured to generate enable signals for the EFUs 2111 and 2112 based at least in part on the barrier tokens from EFUs 2101-2104, and to produce barrier tokens on their control outputs corresponding with barrier 2113. Likewise, the control barrier logic associated with EFUs 2114-2116 is configured to generate enable signals for the EFUs 2114-2116 based at least in part on the barrier tokens from EFUs 2101-2104, and to produce barrier tokens on their control outputs corresponding with barrier 2117. The barrier tokens and enable signals can be used as start and stop events to trigger and terminate instrumentation counters of the instrumentation units.

The barriers 2113 and 2117 can be implemented by control barrier logic in a third level of EFUs, including EFU 2121 and EFU 2122, which are combined to provide a barrier 2123. The barrier 2123 can be applied to a next level, as indicated by line 2125. As can be seen, a variety of instrumentation network configurations can be implemented in each level of the instrumentation network shown in FIG. 21. For example, the first level in FIG. 21 comprises a one level, 4-ary control barrier tree. The barrier tokens can be used as start and stop events to trigger and terminate instrumentation counters of the instrumentation units.

Other Implementations

A first example of accelerated deep learning is using a deep learning accelerator to train a neural network. A second example of accelerated deep learning is using a deep learning accelerator to operate a trained neural network to perform inferences. A third example of accelerated deep learning is using a deep learning accelerator to train a neural network and subsequently perform inference with any one or more of the trained neural networks, information from same, and a variant of same.

Examples of neural networks include Fully Connected Neural Networks (FCNNs), Recurrent Neural Networks (RNNs), Convolutional Neural Networks (CNNs), Long Short-Term Memory (LSTM) networks, autoencoders, deep belief networks, and Generative Adversarial Networks (GANs).

An example of training a neural network is determining one or more weights associated with the neural network, such as by hardware acceleration via a deep learning accelerator. An example of making an inference is using a trained neural network to compute results by processing input data based on weights associated with the trained neural network. As used herein, the term 'weight' is an example of a 'parameter' as used in various forms of neural network processing. For example, some neural network learning is directed to determining parameters that are then usable for performing neural network inferences using the parameters.

A neural network processes data according to a dataflow graph comprising layers of neurons. Stimuli (e.g., input data) are received by an input layer of neurons and the computed results of the dataflow graph (e.g., output data) are provided by an output layer of neurons. Example layers of neurons include input layers, output layers, rectified linear unit layers, fully connected layers, recurrent layers, long short-term memory layers, convolutional layers, kernel layers, dropout layers, and pooling layers. A neural network is conditionally and/or selectively trained, subject to hardware acceleration. After being trained, a neural network is conditionally and/or selectively used for inference, subject to hardware acceleration.

An example of a deep learning accelerator (chip) is one or more relatively specialized hardware elements operating in conjunction with one or more software elements to train a neural network and/or perform inference with a neural network relatively more efficiently than using relatively less specialized hardware elements. Some implementations of the relatively specialized hardware elements include one or more hardware logic circuitry elements such as transistors, resistors, inductors, capacitors, wire interconnects, combinatorial logic (e.g., NAND, NOR) gates, latches, register files, memory arrays, tags for memory arrays, content-addressable memories, flash, ROM, DRAM, SRAM, Serializer/Deserializer (SerDes), I/O drivers, and the like, such as implemented via custom logic, synthesized logic, ASICs, and/or FPGAs. Some of the relatively less specialized hardware elements include conventional CPUs and conventional GPUs.

An example of storage is one or more elements enabled to retain state information, e.g., any one or more of: a flip-flop, a latch or an array of latches, a register or an array of registers, a register file, a memory, a memory array, a magnetic storage device, an optical storage device, SRAM, DRAM, flash, and ROM. In various implementations storage is volatile (e.g., SRAM or DRAM) and/or non-volatile (e.g., flash or ROM).

An example of an Integrated Circuit (IC) is a collection of circuitries implemented on one or more portions of semiconductor material, such as a single die or a plurality of dice. An example of 3D-stacking of dice is providing mechanical connectivity and/or electrical connectivity between the dice, e.g., in a dimension orthogonal to a major surface of the dice, to form a unit. The mechanical connectivity and/or the electrical connectivity are variously implemented, e.g., via one or more of solder balls, microbumps, and through-silicon vias. An example of 2.5D stacking of dice is providing mechanical connectivity and/or electrical connectivity between the dice via a common element (e.g., a silicon interposer) to form a unit, wherein the mechanical connectivity and/or electrical connectivity between each die and the common substrate is in a dimension orthogonal to a major surface of the die. The mechanical connectivity and/or the electrical connectivity are variously implemented, e.g., via one or more of solder balls, microbumps, and through-silicon vias. An example of an Application-Specific Integrated Circuit (ASIC) is an IC designed for a particular use.

An example of a package is an element enabled to mechanically retain and/or contain one or more electronic circuits and/or to electrically interconnect one or more electronic circuits. Example electronic circuits are any one or more of one or more portions of semiconductor material, one or more dice, one or more interposers, and one or more substrates. Particular examples of packages include a BGA package and variants thereof. Some ICs comprise a package. An example of a substrate is an element to mechanically retain and/or electrically interconnect one or more dice and/or one or more packages. A particular example of a substrate is a PCB to, e.g., retain and interconnect packages. Another particular example of a substrate is a silicon interposer to, e.g., couple one or more 3D-stacked or 2.5-stacked dice. Another particular example of a substrate is a package, e.g., retaining a plurality of dice.

The technology disclosed can be applied to other processors like Central Processing Units (CPUs), Graphics Processing Units (GPUs), Field Programmable Gate Arrays (FPGAs), Application-Specific Integrated Circuits (ASICs), Application Specific Instruction-set Processor (ASIP), and Digital Signal Processors (DSPs).

The applications 102 can also be considered graphs, application graphs, dataflow graphs, control flow graphs, data and control flow graphs, user applications, models, deep learning applications, deep neural networks, programs, program images, processes, jobs, and tasks.

A buffer can also be considered a controller or a control node.

A dataflow pipeline can also be considered a data processing pipeline.

A crossbar can also be considered a switch.

Clauses

1. A data processing system, comprising:
    memory storing a dataflow graph with a plurality of compute nodes that asynchronously transmit data along data connections, wherein the dataflow graph includes a loop nest in which loops are arranged in a hierarchy of levels, such that a loop at a second level is within a loop at a first level;
    compile time logic configured to partition execution of the dataflow graph into two or more asynchronous stages by inserting stage buffers inside the loop at the second level and at input/output boundaries between the loop at the first level and the loop at the second level, wherein each of the stages includes one or more compute nodes in the plurality of compute nodes, and the stage buffers include, for each of the stages, one or more input stage buffers and one or more output stage buffers;
    runtime logic configured with the compile time logic to determine a stage latency for each of the stages by calculating elapsed time between input stage buffers of a particular stage receiving a unit of data and output stage buffers of the particular stage receiving results of processing the unit of data through one or more compute nodes of the particular stage; and
    instrumentation profiling logic configured to generate performance statistics for the dataflow graph based on the stage latency determined for each of the stages.

2. The data processing system of clause 1, wherein the compile time logic is further configured to insert additional stage buffers inside the loop at the second level, and
    wherein the additional stage buffers are configured to interface with the stage buffers inserted at the input/output boundaries.

3. The data processing system of clause 1, wherein the elapsed time is a number of elapsed clock cycles.

4. The data processing system of clause 3, wherein the input stage buffers are configured to release a read begun token upon receiving the unit of data.

5. The data processing system of clause 3, wherein the output stage buffers are configured to release a write done token upon receiving the results of processing the unit of data.

6. The data processing system of clause 5, wherein the compile time logic is further configured to configure each of the input stage buffers with an instrumentation counter,
    wherein the instrumentation counter of a particular input stage buffer begins incrementing clock cycles (i.e., start counting the clock cycles or start incrementing the instrumentation counter which counts the clock cycles) when the particular input stage buffer releases a read begun token, and
    wherein the instrumentation counter stops incrementing the clock cycles (i.e., stop counting the clock cycles or stop incrementing the instrumentation counter which counts the clock cycles) when the particular input stage buffer receives, along a control connection, a write done token released by a corresponding output stage buffer.

7. The data processing system of clause 6, wherein the unit of data is a first tensor with a first plurality of vectors, and the results of processing the unit of data are a second tensor with a second plurality of vectors, wherein a size of the first tensor is same as the second tensor, and
wherein the size of the first tensor is different from the second tensor.

8. The data processing system of clause 7, wherein the particular input stage buffer releases the read begun token upon receiving a first vector in the first plurality of vectors.

9. The data processing system of clause 7, wherein the corresponding output stage buffer releases the write done token upon receiving a last vector in the second plurality of vectors.

10. The data processing system of clause 6, wherein the instrumentation counter (or a first instrumentation counter) begins incrementing clock cycles (i.e., start counting the clock cycles or start incrementing the instrumentation counter which counts the clock cycles) for a first count when the particular input stage buffer releases a first read begun token upon receiving a first unit of data for a first processing iteration,
wherein the instrumentation counter (or a second instrumentation counter) begins incrementing clock cycles (i.e., start counting the clock cycles or start incrementing the instrumentation counter which counts the clock cycles) for a second count when the particular input stage buffer releases a second read begun token upon receiving a second unit of data for a second processing iteration,
wherein the instrumentation counter (or a third instrumentation counter) begins incrementing clock cycles (i.e., start counting the clock cycles or start incrementing the instrumentation counter which counts the clock cycles) for a third count when the particular input stage buffer releases a third read begun token upon receiving a third unit of data for a third processing iteration,
wherein the instrumentation counter (or the first instrumentation counter) stops incrementing the clock cycles (i.e., stop counting the clock cycles or stop incrementing the instrumentation counter which counts the clock cycles) for the first count when the particular input stage buffer receives, along the control connection, a first write done token released by the corresponding output stage buffer upon receiving the results of processing the first unit of data for the first processing iteration,
wherein the instrumentation counter (or the second instrumentation counter) stops incrementing the clock cycles (i.e., stop counting the clock cycles or stop incrementing the instrumentation counter which counts the clock cycles) for the second count when the particular input stage buffer receives, along the control connection, a second write done token released by the corresponding output stage buffer upon receiving the results of processing the second unit of data for the second processing iteration, and
wherein the instrumentation counter (or the third instrumentation counter) stops incrementing the clock cycles (i.e., stop counting the clock cycles or stop incrementing the instrumentation counter which counts the clock cycles) for the third count when the particular input stage buffer receives, along the control connection, a third write done token released by the corresponding output stage buffer upon receiving the results of processing the third unit of data for the third processing iteration.

11. The data processing system of clause 1, wherein the particular stage corresponds to the loop at the first level, and the loop at the second level is partitioned into a plurality of stages,
wherein, at each iteration in a batch of iterations of executing the particular stage,
input stage buffers in a first plurality of input stage buffers of the particular stage provide respective units of data to input stage buffers in a second plurality of input stage buffers of a first stage in the plurality of stages, and
at least one output stage buffer of the particular stage receives, from at least one output stage buffer of a last stage in the plurality of stages, results of processing the respective units of data through compute nodes of the plurality of stages, and
wherein respective instrumentation counters of the input stage buffers in the first plurality of input stage buffers calculate, for iterations in the batch of iterations, respective sequences of elapsed times between the input stage buffers in the first plurality of input stage receiving the respective units of data and the at least one output stage buffer of the particular stage receiving the results of processing the respective units of data.

12. The data processing system of clause 11, wherein the instrumentation profiling logic is further configured to determine respective buffer latencies of the input stage buffers in the first plurality of input stage buffers by summing elapsed times in the respective sequences of elapsed times.

13. The data processing system of clause 12, wherein the instrumentation profiling logic is further configured to determine respective per-iteration buffer latencies of the input stage buffers in the first plurality of input stage buffers by dividing the respective buffer latencies by a number of the iterations in the batch of iterations.

14. The data processing system of clause 13, wherein the instrumentation profiling logic is further configured to determine a stage latency of the particular stage by selecting a minimum per-iteration buffer latency in the respective per-iteration buffer latencies.

15. The data processing system of clause 11, wherein the respective instrumentation counters are synchronized to jointly begin incrementing clock cycles (i.e., start counting the clock cycles or start incrementing the instrumentation counters which count the clock cycles) after each input stage buffer in the first plurality of input stage buffers has released a read begun token.

16. The data processing system of clause 15, wherein the respective instrumentation counters are synchronized using synchronization tokens that are passed along control connections between the input stage buffers in the first plurality of input stage buffers.

17. The data processing system of clause 16, wherein the instrumentation profiling logic is further configured to determine the stage latency by selecting a maximum per-iteration buffer latency in the respective per-iteration buffer latencies.

18. The data processing system of clause 17, wherein the instrumentation profiling logic is further configured to determine the stage latency by summing the respective buffer latencies to generate a pan-buffer latency, and dividing the pan-buffer latency by a number of the input stage buffers in the first plurality of input stage buffers.

19. The data processing system of clause 11, wherein each iteration in the batch of iterations has a plurality of sub-iterations of executing a given stage in the plurality of stages,
   wherein, at each sub-iteration in the batch of iterations, one or more input stage buffers of the given stage provide respective units of data to one or more compute nodes of the given stage, and
      at least one output stage buffer of the given stage receives results of processing the respective units of data through the compute nodes of the given stage, and
   wherein respective instrumentation counters of the input stage buffers of the given stage calculate, for sub-iterations in the batch of iterations, respective sequences of elapsed times between the input stage buffers of the given stage receiving the respective units of data and the at least one output stage buffer of the given stage receiving the results of processing the respective units of data.

20. The data processing system of clause 19, wherein the instrumentation profiling logic is further configured to determine respective buffer latencies of the input stage buffers of the given stage by summing elapsed times in the respective sequences of elapsed times.

21. The data processing system of clause 20, wherein the instrumentation profiling logic is further configured to determine respective per-iteration buffer latencies of the input stage buffers of the given stage by dividing the respective buffer latencies by a number of the sub-iterations in the batch of iterations.

22. The data processing system of clause 21, wherein the instrumentation profiling logic is further configured to include the respective buffer latencies, the pan-buffer latency, the respective per-iteration buffer latencies, and the stage latency in the performance statistics.

23. The data processing system of clause 22, wherein the instrumentation profiling logic is further configured to generate a visualization that annotates the dataflow graph with the performance statistics on a stage-by-stage basis.

24. A data processing system, comprising:
   memory storing a dataflow graph for an application, the dataflow graph having a plurality of compute nodes, wherein compute nodes in the plurality of compute nodes are configured to be producers to produce data for execution of the application, and to be consumers to consume the data for execution of the application;
   compile time logic configured to partition execution of the dataflow graph into stages, wherein each of the stages has one or more compute nodes, one or more producers, and one or more consumers;
   runtime logic configured with the compile time logic to determine a processing latency for each of the stages by calculating time elapsed between producers of a particular stage receiving input data and consumers of the particular stage receiving output data, wherein the output data is generated by compute nodes of the particular stage based on processing the input data; and
   instrumentation profiling logic configured to generate performance statistics for the dataflow graph based on the processing latency determined for each of the stages.

25. The data processing system of clause 24, wherein the compile time logic is further configured to configure each of the producers with an instrumentation counter, wherein the instrumentation counter of a particular producer begins incrementing clock cycles (i.e., start counting the clock cycles or start incrementing the instrumentation counter which counts the clock cycles) when the particular producer releases a read begun token, and
   wherein the instrumentation counter stops incrementing the clock cycles (i.e., stop counting the clock cycles or stop incrementing the instrumentation counter which counts the clock cycles) when the particular producer receives, along a control connection, a write done token released by a corresponding consumer.

26. The data processing system of clause 25, wherein the input data is a first tensor with a first plurality of vectors, and the output data is a second tensor with a second plurality of vectors,
   wherein a size of the first tensor is same as the second tensor, and
   wherein the size of the first tensor is different from the second tensor.

27. The data processing system of clause 26, wherein the particular producer releases the read begun token upon receiving a first vector in the first plurality of vectors.

28. The data processing system of clause 26, wherein the corresponding consumer releases the write done token upon receiving a last vector in the second plurality of vectors.

29. A data processing system, comprising:
   compile time logic configured to compile a dataflow graph of an application and generate configuration files, wherein the configuration files define schedules and dependencies of compute operations and memory operations configured to execute the dataflow graph;
   runtime logic configured with the compile time logic to load the configuration files on an array of processing units, and to implement the compute operations and the memory operations on the array of processing units in dependence upon the schedules and dependencies to execute the dataflow graph on the array of processing units; and
   processing units in the array of processing units configured with instrumentation logic, wherein the instrumentation logic is configured to cause generation of performance measures for the implementation of (execution of) the compute operations and the memory operations.

30. The data processing system of clause 29, wherein the configuration files define the schedules and dependencies of routing operations configured to execute the dataflow graph,
   wherein the runtime logic is further configured to implement the routing operations on the array of processing units in dependence upon the schedules and dependencies to execute the dataflow graph on the array of processing units, and
   wherein the instrumentation logic is further configured to cause generation of the performance measures for the implementation of (execution of) the routing operations.

31. The data processing system of clause 30, wherein the instrumentation logic is further configured to release status signals to indicate satisfaction of the schedules and dependencies.

32. The data processing system of clause 31, further comprising an instrumentation network operatively coupled to the processing units, the instrumentation network comprising:
   a control bus configured to form signal routes in the instrumentation network; and
   a plurality of instrumentation units having inputs and outputs connected to the control bus and to the processing units, wherein instrumentation units in the plurality instrumentation units are configured to consume the status signals on the inputs, and to report the performance measures on the outputs based on the status signals.
33. The data processing system of clause 32, wherein the runtime logic is further configured to implement a first compute operation using a first processing unit and a second processing unit in the array of processing units, and
   wherein the first processing unit is configured to read input data, process the input data, generate output data, and write the output data in the second processing unit.
34. The data processing system of clause 33, wherein instrumentation logic at the first processing unit is configured to release a read begun token upon beginning of transmission of the input data in the first processing unit for a current iteration of the first compute operation, and
   wherein instrumentation logic at the second processing unit is configured to release a write done token upon completion of transmission of the output data in the second processing unit for the current iteration.
35. The data processing system of clause 34, wherein an instrumentation unit in the plurality of instrumentation units is operatively coupled to the first processing unit,
   wherein the instrumentation unit is configured to sequentially consume the read begun token and the write done token on a corresponding input, to measure a number of elapsed clock cycles between the beginning of the transmission of the input data in the first processing unit and the completion of transmission of the output data in the second processing unit, and to report the number of elapsed clock cycles on a corresponding output as a performance measure for the implementation of (execution of) the first compute operation.
36. The data processing system of clause 35, wherein the instrumentation unit is further configured to begin incrementing the clock cycles (i.e., start counting the clock cycles or start incrementing the instrumentation counter which counts the clock cycles) when the read begun token is released, and to stop incrementing the clock cycles (i.e., stop counting the clock cycles or stop incrementing the instrumentation counter which counts the clock cycles) when the first processing unit receives the write done token from the second processing unit.
37. The data processing system of clause 34, wherein the instrumentation logic at the first processing unit is further configured to release a read done token upon completion of transmission of the input data in the first processing unit.
38. The data processing system of clause 37, wherein the instrumentation unit is further configured to consume the read done token on the corresponding input, to measure a number of elapsed clock cycles between the beginning of the transmission of the input data in the first processing unit and the completion of transmission of the input data in the first processing unit, to determine a read speed of the first processing unit based on the number of elapsed clock cycles and a number of data units in the input data, and to report the read speed on the corresponding output as a performance measure for the implementation of (execution of) the first compute operation.
39. The data processing system of clause 38, wherein the instrumentation unit is further configured to begin incrementing the clock cycles (i.e., start counting the clock cycles or start incrementing the instrumentation counter which counts the clock cycles) when the read begun token is released, and to stop incrementing the clock cycles (i.e., stop counting the clock cycles or stop incrementing the instrumentation counter which counts the clock cycles) when the read done token is released.
40. The data processing system of clause 34, wherein the instrumentation logic at the second processing unit is further configured to release a write begun token upon beginning of transmission of the output data in the second processing unit.
41. The data processing system of clause 40, wherein the instrumentation unit is further configured to consume the write begun token on the corresponding input, to measure a number of elapsed clock cycles between the beginning of the transmission of the output data in the second processing unit and the completion of transmission of the output data in the second processing unit, to determine a write speed of the first processing unit based on the number of elapsed clock cycles and a number of data units in the output data, and to report the write speed on the corresponding output as a performance measure for the implementation of (execution of) the first compute operation.
42. The data processing system of clause 41, wherein the instrumentation unit is further configured to begin incrementing the clock cycles (i.e., start counting the clock cycles or start incrementing the instrumentation counter which counts the clock cycles) when the first processing unit receives the write begun token from the second processing unit, and to stop incrementing the clock cycles (i.e., stop counting the clock cycles or stop incrementing the instrumentation counter which counts the clock cycles) when the first processing unit receives the write done token from the second processing unit.
43. The data processing system of clause 29, wherein the memory operations further comprise memory address calculation in the processing units to distribute data across the array of processing units.
44. The data processing system of clause 43, wherein the instrumentation units are further configured to count a number of calculated memory addresses that are within a valid range, to count a number of calculated memory addresses that are less than a minimum address, and/or to count a number of calculated memory addresses that are greater than a maximum address, and to report the counts as the performance measures.
45. The data processing system of clause 29, wherein the memory operations further comprise issuing memory requests to the processing units to read data from and write data in the processing units.
46. The data processing system of clause 45, wherein the instrumentation units are further configured to count a number of instances when multiple memory requests issued to a same processing unit in the array of processing units are queued and sequentially fulfilled, and to report the count as a performance measure.

47. The data processing system of clause 46, wherein the instrumentation units are further configured to count a number of elapsed cycles between issuance, queuing, and sequential fulfillment of the multiple memory requests, and to report the count as a performance measure.
48. The data processing system of clause 45, wherein the instrumentation units are further configured to count a number of instances when a particular memory request issued to a particular processing unit in the array of processing units is handed off to another processing unit in the array of processing units for fulfillment due to unavailability of the particular processing unit, and to report the count as a performance measure.
49. The data processing system of clause 48, wherein the instrumentation units are further configured to count a number of elapsed cycles between issuance, handing off, and fulfillment of the particular memory request.
50. The data processing system of clause 29, wherein the memory operations further comprise issuing memory requests to off-chip memory operatively coupled to the array of processing units to read data from and write data in the off-chip memory over a plurality of memory channels.
51. The data processing system of clause 50, wherein the instrumentation units are further configured to count a number of memory requests issued to respective memory channels in the plurality of memory channels, and to report the count as a performance measure.
52. The data processing system of clause 50, wherein the instrumentation units are further configured to count a number of instances when multiple memory requests issued to a same memory channel in the plurality of memory channels are queued and sequentially fulfilled, and to report the count as a performance measure.
53. The data processing system of clause 52, wherein the instrumentation units are further configured to count a number of elapsed cycles between issuance, queuing, and sequential fulfillment of the multiple memory requests, and to report the count as a performance measure.
54. The data processing system of clause 50, wherein the instrumentation units are further configured to count a number of instances when a particular memory request issued to a particular memory channel in the plurality of memory channels is handed off to another memory channel in the plurality of memory channels for fulfillment due to unavailability of the particular memory channel, and to report the count as a performance measure.
55. The data processing system of clause 34, wherein the instrumentation logic is further configured to combine multiple status signals and release a new status signal to indicate satisfaction of multiple ones of the schedules and dependencies.
56. The data processing system of clause 55, wherein execution of the current iteration is dependent upon the instrumentation logic at the first processing unit receiving a write done token from the second processing unit for a previous iteration of the first compute operation and releasing the read begun token for the current iteration, and in response releasing an iteration triggered token.
57. The data processing system of clause 56, wherein the instrumentation unit is further configured to consume the iteration triggered token on the corresponding input, to measure a number of elapsed clock cycles between the iteration triggered token and the write done token for the current iteration, and to report the number of elapsed clock cycles on a corresponding output as a performance measure for the implementation of (execution of) the first compute operation.
58. The data processing system of clause 57, wherein the instrumentation unit is further configured to begin incrementing the clock cycles (i.e., start counting the clock cycles or start incrementing the instrumentation counter which counts the clock cycles) when the iteration triggered token is released, and to stop incrementing the clock cycles (i.e., stop counting the clock cycles or stop incrementing the instrumentation counter which counts the clock cycles) when the first processing unit receives the write done token from the second processing unit for the current iteration.
59. The data processing system of clause 56, wherein execution of the current iteration is dependent upon the instrumentation logic at the first processing unit receiving multiple write done tokens from multiple ones of the second processing unit for the previous iteration and releasing the read begun token for the current iteration, and in response releasing the iteration triggered token.
60. The data processing system of clause 59, wherein the instrumentation unit is further configured to begin incrementing the clock cycles (i.e., start counting the clock cycles or start incrementing the instrumentation counter which counts the clock cycles) when the iteration triggered token is released, and to stop incrementing the clock cycles (i.e., stop counting the clock cycles or stop incrementing the instrumentation counter which counts the clock cycles) when the first processing unit receives multiple write done tokens from the multiple ones of the second processing unit for the current iteration.
61. The data processing system of clause 29, wherein the instrumentation units are further configured with counter chains to increment clock cycles (i.e., start counting the clock cycles or stop incrementing counters in the counter chains which count the clock cycles, and start counting the clock cycles or stop incrementing counters in the counter chains which count the clock cycles).
62. The data processing system of clause 29, wherein the memory operations further comprise interfaces between a host and the array of processing elements, loading data from files, allocating memory space on the off-chip memory, transferring input data to the off-chip memory, allocating memory space on the processing units, loading the input data from the off-chip memory to the processing units, transferring the output data from the processing units to the off-chip memory, and saving the output data to files.
63. A data processing system, comprising:
    compile time logic configured to compile a dataflow graph of an application and generate configuration files, wherein the configuration files define start events and stop events for implementation of (execution of) compute operations and memory operations configured to execute the dataflow graph;
    runtime logic configured with the compile time logic to load the configuration files on an array of processing units, and to trigger the start events and the stop events to implement the compute operations and the memory operations on the array of processing units;
    a control bus configured to form event routes in the array of processing units; and a plurality of instrumentation units having inputs and outputs connected to the control bus and to the processing units, wherein instrumentation units in the plurality instrumentation units are configured to:
consume the start events on the inputs and start counting clock cycles,
consume the stop events on the inputs and stop counting the clock cycles, and
report the counted clock cycles on the outputs.

64. A reconfigurable processor, comprising:
an array of processing units configured to execute runtime events (performance events) to execute an application; and
an instrumentation network operatively coupled to the array of processing units, the instrumentation network comprising:
a control bus configured to form control signal routes in the instrumentation network; and
a plurality of instrumentation counters having inputs and outputs connected to the control bus and to the processing units, instrumentation counters in the plurality instrumentation units configurable to consume control signals on the inputs and produce counts (measurements/instrumentations) of the runtime events on the outputs.

65. The reconfigurable processor of clause 64, wherein the instrumentation network and the instrumentation counters are arranged inside the array of processing units.

66. The reconfigurable processor of clause 64, wherein the instrumentation network and the instrumentation counters are arranged outside the array of processing units.

67. The reconfigurable processor of clause 64, wherein the control signals are generated by the processing units.

68. The reconfigurable processor of clause 64, wherein the control signals are read ready tokens.

69. The reconfigurable processor of clause 64, wherein the control signals are read begun tokens.

70. The reconfigurable processor of clause 64, wherein the control signals are read done tokens.

71. The reconfigurable processor of clause 64, wherein the control signals are write ready tokens.

72. The reconfigurable processor of clause 64, wherein the control signals are write begun tokens.

73. The reconfigurable processor of clause 64, wherein the control signals are write done tokens.

74. The reconfigurable processor of clause 64, wherein the control signals are barrier tokens.

One or more implementations of the technology disclosed, or elements thereof can be implemented in the form of a computer product including a non-transitory computer readable storage medium with computer usable program code for performing the method steps indicated. Furthermore, one or more implementations of the technology disclosed, or elements thereof can be implemented in the form of an apparatus including a memory and at least one processor that is coupled to the memory and operative to perform exemplary method steps. Yet further, in another aspect, one or more implementations of the technology disclosed or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

These and other features, aspects, and advantages of the technology disclosed will become apparent from the following detailed description of illustrative implementations thereof, which is to be read in connection with the accompanying drawings.

While the present invention is disclosed by reference to the preferred implementations and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following clauses.

What is claimed is:

1. A reconfigurable processor, comprising:
an array of processing units configured to execute runtime events to execute an application; and
an instrumentation network operatively coupled to the array of processing units, the instrumentation network comprising:
a control bus configured to form control signal routes in the instrumentation network; and
a plurality of instrumentation counters having inputs and outputs connected to the control bus and to processing units in the array of processing units, instrumentation counters in the plurality instrumentation counters configurable to consume control signals on the inputs and produce counts of the runtime events on the outputs,
wherein the control signals are read ready tokens.

2. The reconfigurable processor of claim 1, wherein the instrumentation network and the instrumentation counters are arranged inside the array of processing units.

3. The reconfigurable processor of claim 1, wherein the instrumentation network and the instrumentation counters are arranged outside the array of processing units.

4. The reconfigurable processor of claim 1, wherein the control signals are generated by the processing units.

5. The reconfigurable processor of claim 1, wherein the control signals are read begun tokens.

6. The reconfigurable processor of claim 1, wherein the control signals are read done tokens.

7. The reconfigurable processor of claim 1, wherein the control signals are write ready tokens.

8. The reconfigurable processor of claim 1, wherein the control signals are write begun tokens.

9. The reconfigurable processor of claim 1, wherein the control signals are write done tokens.

10. The reconfigurable processor of claim 1, wherein the control signals are barrier tokens.

* * * * *